US009672646B2

(12) United States Patent
Harris et al.

(10) Patent No.: US 9,672,646 B2
(45) Date of Patent: Jun. 6, 2017

(54) SYSTEM AND METHOD FOR IMAGE EDITING USING VISUAL REWIND OPERATION

(75) Inventors: Jerry G. Harris, Newberry, FL (US); Scott L. Byer, Cupertino, CA (US); Stephan D. Schaem, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1338 days.

(21) Appl. No.: 12/550,266

(22) Filed: Aug. 28, 2009

(65) Prior Publication Data

US 2013/0120439 A1    May 16, 2013

(51) Int. Cl.
| | |
|---|---|
| *G06T 11/60* | (2006.01) |
| *G06K 9/00* | (2006.01) |
| *G11B 27/034* | (2006.01) |
| *G11B 27/34* | (2006.01) |
| *G06F 3/0484* | (2013.01) |
| *G06T 13/80* | (2011.01) |

(52) U.S. Cl.
CPC .......... *G06T 11/60* (2013.01); *G06F 3/04845* (2013.01); *G06K 9/00744* (2013.01); *G06T 13/80* (2013.01); *G11B 27/034* (2013.01); *G11B 27/34* (2013.01)

(58) Field of Classification Search
CPC ......... G06F 3/04845; G06F 2207/7242; G06T 11/60; G06T 7/0079; G06T 13/80; G06K 9/00744
USPC ........................................................ 345/619
See application file for complete search history.

(56) References Cited

U.S. PATENT DOCUMENTS

| | | | | |
|---|---|---|---|---|
| 5,692,117 A | * | 11/1997 | Berend et al. | ................. 345/475 |
| 5,844,563 A | * | 12/1998 | Harada et al. | ................. 345/420 |
| 6,493,042 B1 | * | 12/2002 | Bozdagi | ................. H04N 5/147 |
| | | | | 348/700 |
| 6,750,890 B1 | | 6/2004 | Sugimoto | |
| 7,062,497 B2 | | 6/2006 | Hamburg | |

(Continued)

OTHER PUBLICATIONS

Steinmetz et al. "Multimedia Fundamentals, vol. 1: Media Coding and Content Processing, 2nd Ed.", Jan. 2002, p. 105-168.*

(Continued)

*Primary Examiner* — Michelle L Sams
(74) *Attorney, Agent, or Firm* — Wolfe-SBMC

(57) ABSTRACT

Systems, methods, and computer-readable storage media for performing a visual rewind operation in an image editing application may include capturing, compressing, and storing image data and interaction logs and correlations between them. The stored information may be used in a visual rewind operation, during which a sequence of frames (e.g., an animation) depicting changes in an image during image editing operations is displayed in reverse order. In response to navigating to a point in the animation, data representing the image state at that point may be reconstructed from the stored data and stored as a modified image or a variation thereof. The methods may be employed in an image editing application to provide a partial undo operation, image editing variation previewing, and/or visually-driven editing script creation. The methods may be implemented as stand-alone applications or as program instructions implementing components of a graphics application, executable by a CPU and/or GPU.

20 Claims, 11 Drawing Sheets

(56) References Cited

U.S. PATENT DOCUMENTS

| | | | |
|---|---|---|---|
| 2002/0051000 A1* | 5/2002 | Anami et al. | 345/582 |
| 2003/0164847 A1* | 9/2003 | Zaima et al. | 345/723 |
| 2004/0054964 A1* | 3/2004 | Bozdagi | G06F 17/30787 |
| | | | 715/202 |
| 2006/0170704 A1 | 8/2006 | Kotani | |
| 2007/0030286 A1* | 2/2007 | Hirasaka | 345/619 |
| 2008/0244374 A1 | 10/2008 | Hattori | |
| 2008/0250314 A1 | 10/2008 | Larsen | |

OTHER PUBLICATIONS

McFarlane, Bob, "Beginning AutoCAD 2002", Butterworth-Heinemann, 2002, pp. 129-131.*

Grabowski, Ralph, "The Illustraded AutoCAD 2002 Quick Reference", Thomson Learning, 2002, pp. 108-110, 114, 121.*

* cited by examiner

SYSTEM AND METHOD FOR IMAGE EDITING USING VISUAL REWIND OPERATION

BACKGROUND

Description of the Related Art

Graphic applications include an ever-increasing number of image editing features, such as various filtering options and resizing operations (e.g., for cropping, expanding, or reducing an image). In order to undo or redo an image editing operation, a typical image editing application may provide a simple undo command. A simple undo command may provide a coarse, non-intuitive method to rollback changes. This method is not effective if more then a couple of changes need to be rolled back. Currently, the user corrects mistakes by choosing undo from a menu, or by clicking on a history state in the history palette of an application. However, the visual hint for a history state may be nothing more than a very small icon, or generic text string such as "typing" or "brush stroke", which may quickly lose its uniqueness in the context of a series of such operations. Navigating an undo/redo queue limits the operation to be undone or redone to certain types of commands. In typical applications it is not possible to undo portion of a continuous operation (such as a brush stroke in a painting application). Similarly for image editing applications that employ trackers, only the state at the end of the tracking cycle is typically captured (i.e. the result of a complete paint stroke).

Some image editing applications include the notion of scripting commands. Such applications typically create a log of discrete commands, and may include play, pause, and stop types of functions for navigating the log of commands. As functions become less modal (such as color adjustments implemented in palettes), state changes occur rapidly, and mechanisms are typically added to automatically coalesce several modeless changes into a single history state that is committed or discarded as if it were a single image editing operation.

SUMMARY

Systems, methods, and computer-readable storage media for performing a visual rewind operation in an interactive image editing application are disclosed. In some embodiments, the image editing application may be configured to capture, compress, and store image data and interaction logs, and to use the stored information in a visual rewind operation, in which a sequence of frames (e.g., an animation) depicting changes in an image as image editing operations are performed is displayed in reverse order. In various embodiments, the system and methods described herein may be employed in an image editing application to provide a partial undo operation, image editing variation previewing, and/or visually-driven editing script creation.

In some embodiments, a system, as described herein, may be configured to capture image data representing a sequence of frames displayed by an image editing application during performance of one or more image editing operations, where each frame is associated with an identifier of the frame. The frame identifier may include a frame number and/or a timestamp, in various embodiments. The system may also be configured to capture data representing a log of interactions and corresponding changes in application state for the image editing application during performance of the one or more image editing operations. The system may be configured to compress the captured image data using one or more transformation and/or compression techniques, as described herein.

In some embodiments, the system may be configured to determine a correlation between each of the entries in the log and a respective frame identifier. The respective frame identifier may correspond to a frame of the sequence of frames depicting a change in the image due to the interaction and corresponding changes in application state represented by a given log entry. In embodiments in which each frame identifier includes a timestamp and each entry of the log includes a timestamp, determining a correlation may include identifying a log entry and a frame identifier that include matching timestamps.

In some embodiments, the system may be configured to store the captured image data, the log data, and data representing the correlation between each of the plurality of entries and the respective frame identifier. In performing a subsequent operation of the image editing application (e.g., a visual rewind operation), the system may be configured to display at least a portion of the sequence of frames (e.g., as an animation), dependent on the stored data.

Capturing the image data may in some embodiments include capturing image data for each frame displayed during performance of the image editing operations. In other embodiments, capturing the image data may include determining whether there are any differences in the image between adjacent frames displayed by the image editing application during the performance of the image editing operations and only capturing data reflecting any determined differences between the adjacent frames. In some embodiments, image data may be captured representing a complete frame for frames in the sequence of frames identified as key frames. For example, frames depicting the result of an atomic collection of image editing operations may be designated as key frames, in some embodiments. In other embodiments, key frames may be designated on a periodic basis by time (e.g., once every second) or by frame count (e.g., one out of every 100 frames).

In some embodiments the system may be configured to capture the image and/or application state in enough detail during an image editing operation that a visual rewind operation may be used to identify and reconstruct the image state at a point representing the partial performance of the operation, such as between two or more sub-operations of an image editing operation specified using a single interaction (e.g., a partial brush stroke). In other embodiments, the system may be configured to capture, identify, and reconstruct the image state depicted during or between image editing operations executed atomically by the image editing application (e.g., a collection of adjustments that are discarded or take effect as a group when performed within a palette or dialog).

In response to receiving input indicating the invocation of a visual rewind operation in the image editing application, the system may be configured to initiate the display of the sequence of frames in reverse order. In such embodiments, in response to receiving input indicating the suspension of the visual rewind operation (e.g., by selection of a "pause" or "stop replay" operation), the system may be configured to generate image data representing the image state at a point during the performance of the one or more image editing operations corresponding to the frame currently being displayed. In some embodiments, generating this image data may be dependent on the identifier of the frame and the stored data representing the correlation between the identifier of the frame and the respective log entry. The system may be configured to store this generated data as data representing a modified image.

In some embodiments, to generate the image data representing the image state at the point corresponding to the frame currently being displayed, the system may be configured to determine a key frame preceding the currently displayed frame in the sequence, identify one or more log entries representing interactions and corresponding application state changes logged between the log entry for the key frame and the log entry for the frame, and apply the interactions represented by the identified log entries to image data representing the key frame to reconstruct the image state depicted in the frame.

The methods described herein may be implemented as program instructions, (e.g., stored on computer-readable storage media) executable by a CPU and/or GPU configured for parallel processing, in various embodiments. For example, they may be implemented as program instructions that, when executed, implement capturing, compressing, and storing image data and interaction logs, and using the stored information in a visual rewind operation, in different embodiments. In various embodiments, performing as many of these operations as possible on a GPU may reduce their effect on the overall performance of the interactive image editing application through which they are executed. For example, in various embodiments, all or a portion of operations for capturing and/or compressing image data during image editing operations may be off-loaded to the GPU, rather than being executed by the CPU.

Figure 1:
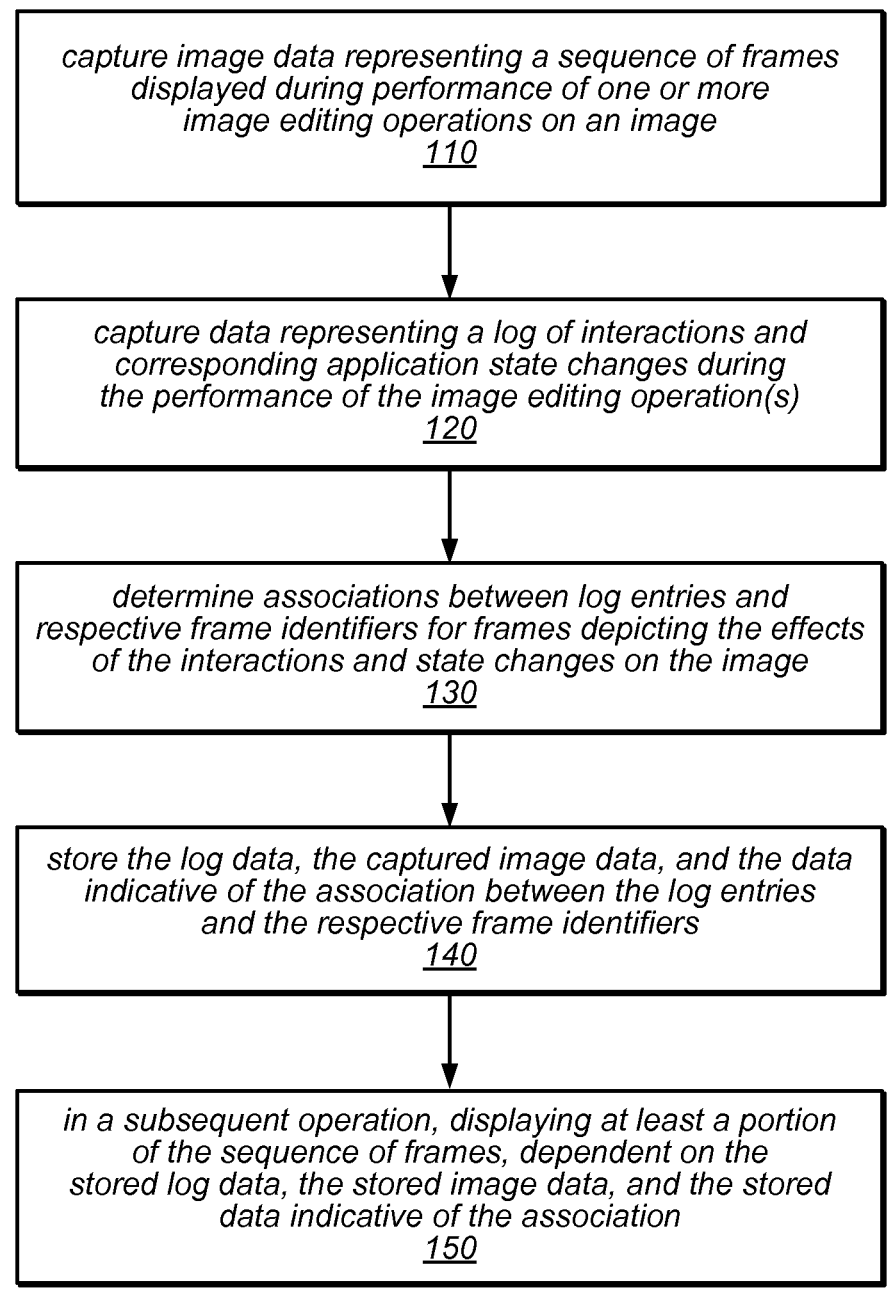
FIG. 1 is a flow diagram illustrating a method for capturing workspace data for use in a visual rewind operation of an image editing application, according to various embodiments.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The system and methods described herein may in some embodiments allow users to perform a visual rewind operation in an interactive image editing application. The methods may include capturing, compressing, and storing image data and interaction logs and determining correlations between them. The stored information may be used in a visual rewind operation, during which a sequence of frames (e.g., an animation) depicting changes in an image during performance of image editing operations is displayed in reverse order. In response to navigating to a given point in the animation, data representing the image state at that point may be reconstructed from the stored data and stored as a modified image or a variation thereof. The methods may be employed in an image editing application to provide a partial undo operation, image editing variation previewing, and/or visually-driven editing script creation.

The system and methods described herein may tap into a skill that a large percentage of users of image editing application may comprehend. That skill is the use of a rewind button to reverse time. This is a skill acquired from watching videos, DVDs, digital video recorders, etc., and most users understand how to use this skill to navigate through a video to identify a desired frame or state. The system and methods described herein may provide a mechanism by which a user may navigate through an animation of the performance of one of or more image editing operations to identify a point at which an image state or document is correct or a point at which the user wishes to save and/or further process the depicted image.

Most graphical editing applications provide real time updates through feedback in a window. These updates may in some embodiments represent frames of an animation, which may be captured and potentially compressed as a movie. Simultaneously, the image application may record a log of interactions and state changes, which may be correlated with frame numbers on the animation. In some embodiments, if the user wishes to undo an image editing operation, or a portion thereof, the user may employ a skill learned at an early age, which is that depressing the rewind button causes state to go back in time in a continuous manner. In some embodiments an animation representing image data captured during performance of one or more image editing operations may be used to provide visual feedback, and may include (and provide) frame numbers, which may be correlated with entries in the interaction log. Once the user has navigated to the frame that represents the image state they wish to return to, the log data may be used to reconstruct the state at that point in the timeline of the animation. In some embodiments, an image state just prior to the identified point may be used as a starting point for the reconstruction. Interactions logged between this prior image state and the state depicted at the identified point in the timeline may be applied to reconstruct the exact desired state.

The workspace tracking described herein may in some embodiments be performed solely on the GPU, and/or may be performed by the system processor (CPU) and stored in system memory or mass storage (e.g., disk). In some embodiments, the functionality may be presented as a rewind button, e.g., in a history palette, at the bottom of a document window, or in a tools area in an image editing application. In various embodiments, when the rewind button is depressed, the system may be configured to play back a movie of one of:

A fixed size window of time (60 seconds).
A collection of changes over an atomic operation such as a series of color adjustments that have been coalesced as one history state.
The entire history process A method for capturing workspace data for use in a visual rewind operation of an image editing application is illustrated in FIG. 1, according to one embodiment. As illustrated in this example, the method may include two components for capturing workspace data. For example, the method may include capturing image data representing a sequence of frames displayed by the image editing application during performance of one or more image editing operations on an image, as in 110. As previously noted, each frame in the sequence may be associated with an identifier of the frame (e.g., a frame number and/or timestamp), in various embodiments. Many graphical editing applications provide real-time updates through feedback displayed in a window. In some embodiments, these updates may represent frames of an animation, which may be captured (e.g., copied from a frame buffer) as a movie.

In some embodiments, data representing the captured frames may pass through a GPU in the system on the way to being displayed. Therefore, the GPU may be leveraged to compress the image data in real time using one or more compression techniques. For example, a compression technique that includes temporal tracking may be employed by the GPU. The movie may be stored in the GPU space or in CPU space, in different embodiments. In some embodiments, the movie may be streamed to the CPU during idle time for archival backup. The image editing application may in some embodiments provide information to the compressor that indicates the area of change, which may further speed compression, and improve quality. The creation of the movie from the workspace by the GPU may in some embodiments be very efficient and may have no measurable impact on the performance of the interactive image editing application itself, even if the image editing application is GPU bound.

Figure 5:
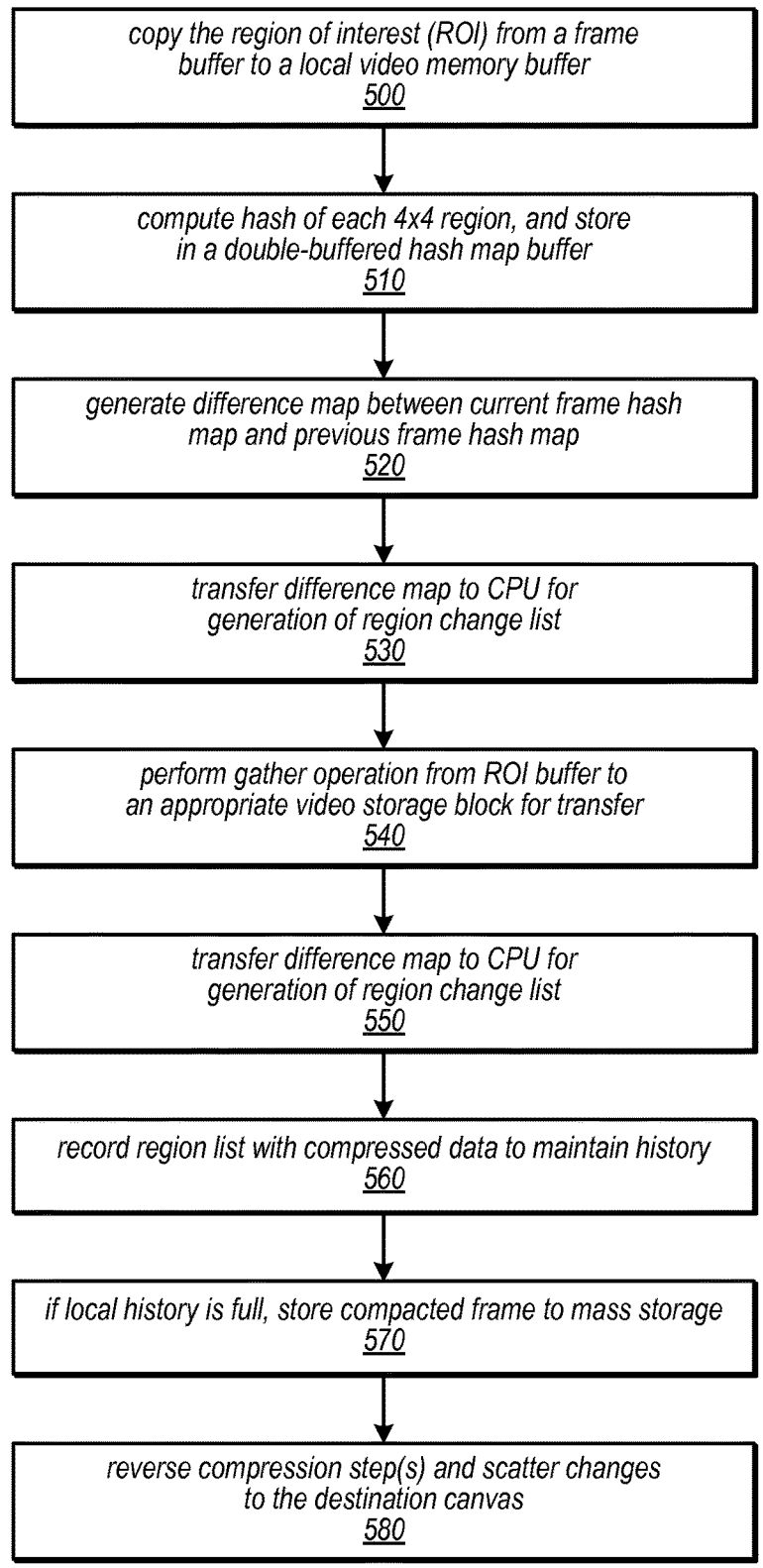
FIG. 5 is a flow diagram illustrating a method for compressing data usable in a visual rewind operation of an image editing application, according to various embodiments.

In some embodiments, the method may include capturing image data for all frames displayed by the image editing application during the performance of the image editing operations. In other embodiments, the method may include determining whether there are any differences in the image between adjacent frames displayed by the image editing application during the image editing operations, and only capturing data reflecting the determined differences between adjacent frames. One technique for capturing data reflecting the differences between frames is illustrated in FIG. 5 and described in detail below.

As illustrated in 120 of FIG. 1, the method may include a second component of the capture process, in which data representing a log of interactions and corresponding changes in the application state of the image editing application during the image editing operations is captured. In some embodiments, while image data for the animation is being captured, the method may include simultaneously recording a log of interactions and corresponding state changes (e.g., based on input received from the image editing application), which may then be correlated with frame numbers on the animation. In some embodiments, the system may be configured to capture the subtle changes made during each image editing operation. For example, the system may track the movement of a slider bar in a color correction palette or dialog, and may log the changes made between each frame displayed during this operation (e.g., at 60 frames per second). In another example, the system may track and capture in the log the detail of a stylus movement on a tablet representing a brush stroke in a painting application. As a log generator or generates and stores entries in the interaction log, a timestamp and/or frame number may be recorded in the each log entry. In some embodiments, the interaction log may be compressed and/or may be configured to capture only the derivative of changes made to the image or application state during an image editing operation.

In some embodiments, the method may include capturing image data and/or storing entries in the interaction log in a sliding time window, for a given number of interactions, or for a given number of frame changes (e.g., until the log is full), and may include replacing older entries with new entries once the log is full (not shown). In some embodiments, the method may include capturing image data and/or interaction log entries for two or more image editing operations performed during an image editing session (e.g., for two or more image editing operations performed on an image between the times that snapshots of the image are saved). In some embodiments, the method may include capturing image data and/or interaction log entries for two or more image editing operations performed as part of an atomic collection of image editing operations (e.g., a collection of changes made in a color palette or dialog that are committed as a group). In some embodiments, the method may include capturing image data and/or interaction log entries for two or more sub-operations of an image editing operation (e.g., for each portion of a brush stroke depicted differently on adjacent frames as the stroke is applied to the image). In some embodiments, capturing image data and interaction logs at this level of detail may facilitate the partial undo of an operation within an atomic operation or the partial undo of a single operation, as described in more detail below.

As illustrated in 130 of FIG. 1, the method may include determining a correlation between each of the entries in the log and a respective frame identifier, where the respective frame identifier corresponds to a frame of the animation depicting a change in the image due to the interaction and corresponding change in application state represented by the entry. For example, in embodiments in which the frame identifier of each frame of the animation includes a timestamp, and each entry of the log includes a timestamp, such a determination may be performed by searching the captured image data and interaction log for matching timestamps. In other embodiments, if the frame identifier of each frame includes a frame number, each entry of the log may include a corresponding frame number, rather than to a timestamp, and these frame numbers may be matched up to determine a correlation between frames of the animation and the log entries.

As illustrated in 140 of FIG. 1, the method may include storing the captured image data (e.g., the animation data), the interaction log data, and data representing the correlation between each of the plurality of entries and the respective frame identifier. In some embodiments all or a portion of this information may be stored in GPU space, relieving the load on the CPU. For example, in one embodiment, at least the image data may be captured, compressed, and/or stored on the GPU, while other information (e.g., the interaction logs and/or mappings between frame numbers and log entries) may be captured, compressed, and/or stored in CPU space.

As illustrated in 150 of FIG. 1, the method may include, in a subsequent operation of the image editing application, displaying at least a portion of the sequence of frames, dependent on the stored data (e.g., the animation data, the interaction log data, and the mapping data). For example, in response to receiving input indicating the invocation of a visual rewind operation in the image editing application, the method may include initiating display of the animation (i.e. the sequence of frames) in reverse order, in some embodiments.

Note that the method illustrated in FIG. 1 may in various embodiments be applied to capture and store data reflecting the editing of a single image or a collection of image editing operations performed on multiple images (e.g., different image and/or pages in the same document or file) within an editing session (e.g., between consecutive file saving operations).

In embodiments in which capturing the image data primarily involves capturing data representing the changes in the image between frames, the method may also include capturing a more complete representation of frames identified as "key frames". For example, frames depicting the result of an atomic collection of image editing operations may be designated as key frames, in some embodiments. In other embodiments, each frame depicting the results of a discrete operation may be designated as a key frame. In other embodiments, key frames may be designated on a periodic basis by time (e.g., once every second) or by frame count (e.g., one out of every 100 frames). In still other embodiments, a key frame may be designated whenever a given block has not been updated in a pre-determined amount of time or in a pre-determined number of sequential frames. In various embodiments, the method may include storing all of the image data for a key frame (including its frame identifier), such that a subsequent image reconstruction operation may use this data as a starting point, rather than having to use the first data captured in a sliding window of frame data captured by the image editing application. In other words, when processing designated key frames, the method may include capturing an image state that is self-contained in terms of the information needed to return to that state, in some embodiments. In such embodiments, image data captured for other frames (i.e. non-key frames) may reflect only the changes in the image since data for the most recent key frame was captured. The use of key frames may in some embodiments serve to reduce seek time during reconstruction/decompression operations, as described in more detail herein.

In some embodiments a visual rewind operation may be used to identify a point in an image editing session at which the image depicted by the image editing application during performance of one or more editing operations is an image that the user wishes to reconstruct and/or save for future use. For example, the visual rewind operation may be used to identify a point corresponding to the partial performance of one or more image editing operations (e.g., the middle of a brush stroke, or the point at which a subset of a collection of atomic color adjustments has been made and displayed). In some embodiments, after identifying a given point in the animation displayed by the visual rewind operation, the system may be configured to generate and/or reconstruct modified image data that represents the exact state of the image depicted in the animation frame that was captured mid-operation at that point.

Figure 2:
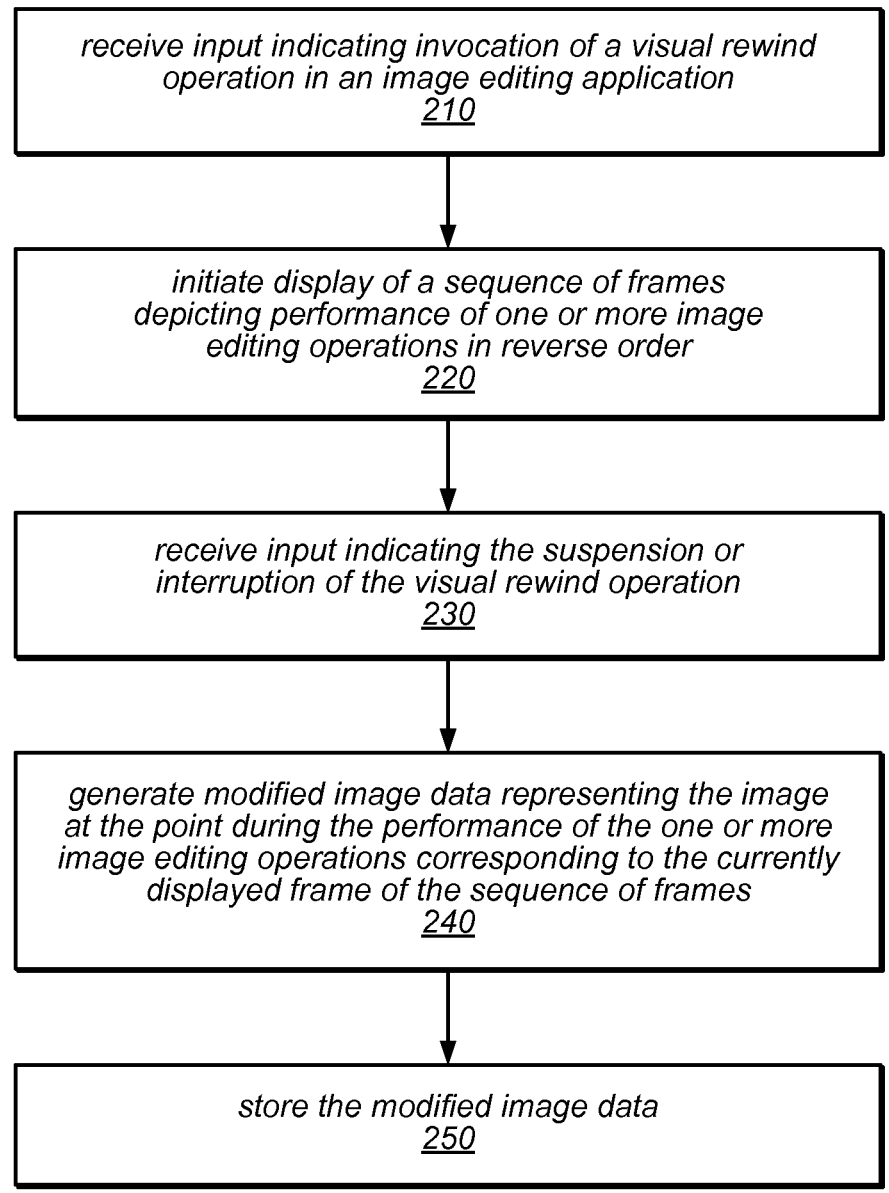
FIG. 2 is a flow diagram illustrating a method for performing a visual rewind operation in an image editing application, according to various embodiments.

A method for performing a visual rewind operation is illustrated in FIG. 2, according to one embodiment. As illustrated in 210 of FIG. 2, the method may include receiving input indicating the invocation of a visual rewind operation in an image editing application. In this example, if the user wishes to undo an image editing operation, they may select a visual rewind operation in the image editing application.

As illustrated in 220 of FIG. 2, in response to receiving the indication of the invocation of the visual rewind operation, the method may include initiating the display of a sequence of frames (e.g., an animation) depicting the effect(s) of one or more image editing operations on an image during performance of the operation(s) in reverse order. If and when the user observes a point in the animation to which they would like the editing session to return, (i.e., once the user has navigated to the frame that represents the image state they wish to return to), the user may stop or suspend the display of the animation (e.g., by releasing the rewind button, or selecting a "pause" or "stop replay" button). As illustrated in 230 of FIG. 2, the method may include receiving input indicating the suspension or interruption of the visual rewind operation.

Figure 3:
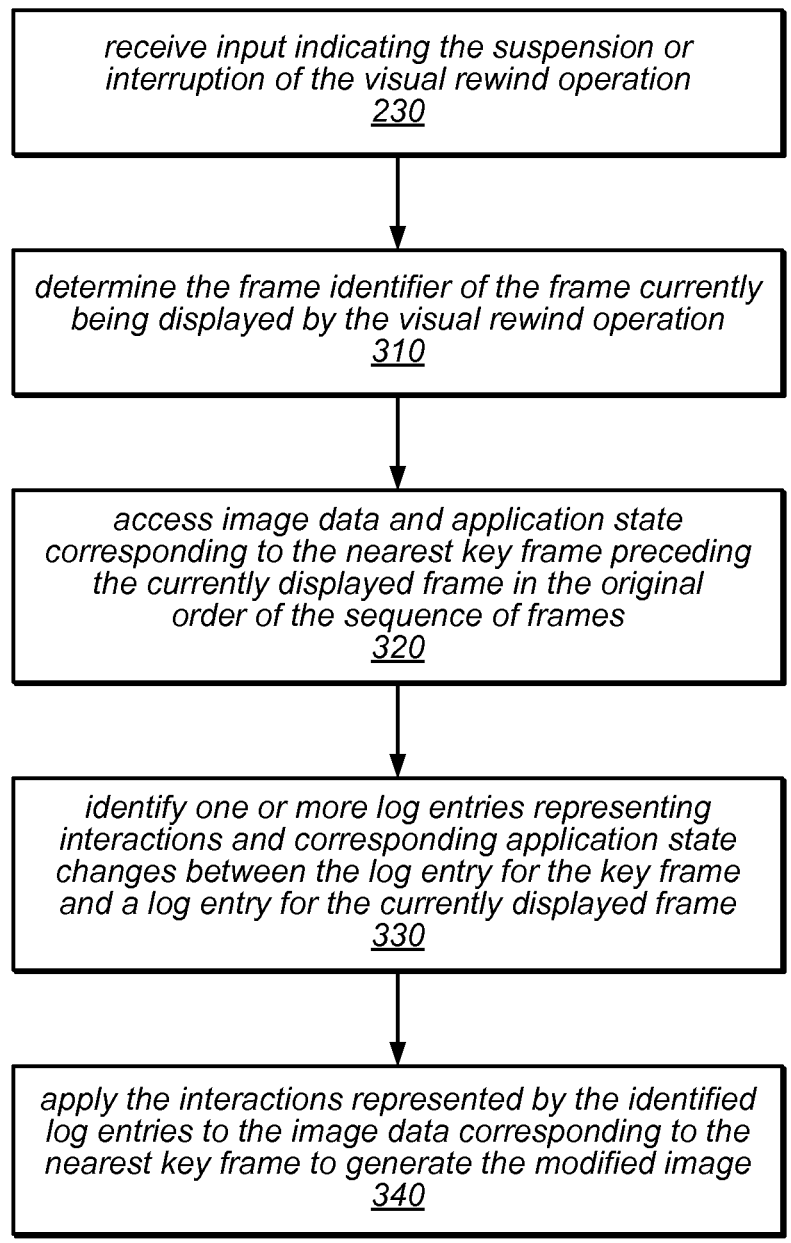
FIG. 3 is a flow diagram illustrating a method for reconstructing an edited image as it was depicted at a point in the editing operation identified during a visual rewind operation, according to various embodiments.

In response to receiving input indicating the suspension or interruption of the visual rewind operation, the method may include generating or reconstructing image data representing the state of the image at the point during the performance of the image editing operations corresponding to the image depicted in the frame of the animation currently being displayed, as in 240. One method for reconstructing the image state corresponding to the currently displayed frame is illustrated in FIG. 3 and described in detail below. The image data representing the state of the image at the point at which the visual rewind operation is suspended may in some embodiments be stored as data representing a modified version of the input image, as in 250.

In some embodiments, generating, reconstructing, and/or storing image data representing the state of the image at the point at which the visual rewind operation is suspended may be performed in response to receiving input indicating the selection of an operation to save the currently displayed image, following the suspension of the visual rewind operation (not shown). For example, in some embodiments, the system may be configured to allow a user to initiate a rewind operation, pause, fast forward, fast reverse, and/or rewind again in various combinations (causing various frames of the animation to be displayed in forward or reverse order) before identifying a point of interest in the animation. In other words, the system may be configured to allow a user to arbitrarily (and visually) navigate an undo/redo queue of the image editing application. Once the user has navigated to the point of interest, the system may be configured to allow the user to indicate this by selecting an operation to save the current image. In some embodiments, when saving the reconstructed image, the system may provide an option for the user to specify and image version name or number, or a file name or number, such that different versions may be distinguished from each other if several variations are generated and previewed.

Note that in various embodiments, because the system may capture data representing a fine-grained sequence of frames (e.g., 60 frames per second) depicting the effects on the image as various image editing operations are performed, the animation displayed during a visual rewind operation may include enough detail to allow a user to identify a point of interest that does not correspond to a discrete boundary between image editing operations. In other words, the system may be configured to store and display enough information to allow a user to perform a "partial undo" operation in various scenarios. In some embodiments, a "partial undo" operation may employ timestamps in conjunction with the animation stream and interaction logs to partially undo operations such as paint strokes, or to partially undo an operation that was performed as part of an atomic operation (e.g., in a palette or dialog), as described herein. For example, the system may be configured to capture image data and interaction log entries an atomic collection of image editing operations, and may subsequently restore the image state at a point at which only a subset of the atomic collection of image editing operations has been applied. In another example, the system may be configured to restore the image state at a point between two sub-operations of an image editing operation defined using a single interaction (e.g., in the middle of a brush stroke). In yet another example, the visual rewind operation may be used to identify any point during the performance of one or more image editing operations performed on an image between the times that snapshots of the image are saved (assuming the required information is present in the sliding window of information available at the time the rewind operation is invoked).

A method for reconstructing an edited image as it was depicted at a point in the editing operation identified during a visual rewind operation is illustrated in FIG. 3, according to one embodiment. As noted above, the method may in some embodiments, include receiving input indicating the suspension or interruption of the visual rewind operation, as in 230, and using the stored image data and interaction log data to reconstruct the image state at the point in the timeline of the animation at which the animation is suspended. In some embodiments, reconstruction of the image state at the point at which the animation is suspended may be performed in response to receiving input indicating the invocation of an operation to save the currently displayed image while a rewind operation is suspended.

As illustrated in 310 of FIG. 3, the method may in some embodiments include determining the frame identifier of the frame being displayed by the suspended visual rewind operation. As previously noted, the frame identifier may include a frame number and/or a timestamp, in various embodiments. In some embodiments, the frame identifier of each frame may be stored along with the image data, and may be determined by accessing that stored data.

As illustrated in 320 of FIG. 3, the method may include accessing stored image data and application state corresponding to the nearest key frame that precedes the currently displayed frame in the original order of the sequence of frames (in the order in which the image editing operations were performed). For example, in embodiments in which not all frames of the animation are captured and stored, or in which some captured and stored frames include only change information, the method may include identifying and accessing data corresponding to the last complete image state captured and stored in the animation prior to the capture of image data representing the currently displayed frame.

As illustrated in 330 of FIG. 3, the method may include identifying one or more log entries representing interactions and corresponding application state changes between the log entry for the identified key frame and a log entry for the currently displayed frame. The method may also include applying the interactions represented by the identified log entries to the image data corresponding to the nearest key frame to generate a modified image reflecting the image state at the desired point in the sequence of image editing operations, as in 340. In other words, the method may in some embodiments include reconstructing the modified image by starting with the image data for the most recent key frame, and applying the interactions recorded in the log between the time the image data for that key frame data was captured (as indicated by the frame number and/or timestamp mapped to the corresponding log entry) and the time that the image data corresponding to the currently displayed image was captured (as indicated by the frame number and/or timestamp associated with the currently displayed frame).

The techniques described herein may in some embodiments also support image editing features such as bookmarking, time range selection within an image editing animation, and multiple variation previewing. In some embodiments, a variation previewing feature may employ the visual rewind and image state reconstruction techniques to provide a user a way to make various changes to a project in an image editing application and to review the various states, scrubbing the workspace timeline. For example, a variation preview feature may allow a user to save the results of a collection of image editing operations as one variation of an edited image, to rewind a captured animation, to reconstruct an intermediate version of the image, and to perform a different collection of image editing operations on the reconstructed image to produce an alternate variation of the edited image. In such embodiments, by iteratively performing editing operations, rewinding, and reconstructing the image from different points in the captured animation, multiple variations may be generated and previewed by the user, following multiple variation branches or chains.

In addition, these techniques may provide a way for a user to redo or partially redo a single image editing operation or to redo or partially redo a collection of image editing operations (whether or not they are included in an atomic collection of operations). The user may in various embodiments choose to save any or all of the variations generated and previewed, or may choose to save only the variation selected after previewing multiple options. Note that in some embodiments, the system may allow a user to control the area affected by an operation that is re-applied after being logged. For example, when re-applying one of the logged interactions after a rewind operation (e.g., in a redo type operation), the user may be able to apply the interaction to a selected portion of the image other than the portion to which it was originally applied. In another example, when applying one or more interactions logged as part of a saved editing script, the user may be able to select a portion of an image on which to apply the script, or any subset of the logged interactions thereof (e.g., a portion of the same image that was being editing when the script was captured, or a portion of another image to which the script is being applied).

In some embodiments, the techniques described herein may be used in implementing a "time range selection" features. In such embodiments, such a feature may be used to select a group of image editing commands based on their time proximity, allowing selection of a collection of operations (e.g., brush strokes and/or color adjustments) regardless of the canvas location at which they were applied, or whether they were sequential commands. In some embodiments, a collection of image editing operations selected from a timeline representation of an image editing animation may be saved as an image editing script, and the same operations may be subsequently applied to another image by applying the saved script. In some embodiments, a collection of image editing operations may be "cut" from a timeline associated with one image editing session or portion thereof and "pasted" into another timeline to apply or reapply the selected operations to an image being edited.

In some embodiments, additional information may be recorded as part of the interaction log, such as voice or text annotations (comments) input to the image editing application during the performance of image editing operations. For example, in a system that includes a microphone, a user may record a description of an image editing operation and/or the goal of the operation, and this recording may be included in, or stored and referenced by, the corresponding entry or entries in the interaction log.

Note that storing high-resolution images in a manageable amount of storage space in a typical image editing application can be a processor-intensive task that can greatly affect the interactive performance the application. In these typical applications, it may be possible to capture image data representing a region of interest in an image (e.g., a region in which one or more image editing operations have been applied) at very low resolution. However, this may provide a blurred result, and may not be acceptable for all types of editing, as much of the information of interest may be lost or distorted. Using standard methods to capture and compress the application workspace may consume too much of the processing power of the CPU, taking it away from the image editing application. In order to maintain interactive performance, this loss of processing power in such applications would need to be offset by greatly reducing visual sharpness/resolution, which is not ideal.

In some embodiments, a system configured to provide a visual rewind feature for undoing and redoing operations based on a workspace capture method, as described herein, may include a compression system to reduce the amount of storage needed to store the captured information. For example, without employing one or more compression techniques, the amount of memory needed to store image data reflecting a sequence of frames that represent the visual changes displayed during image editing could surpass the available memory capacity and mass storage bandwidth. In addition, in some embodiments, the system may be configured to spend as few computation resources as possible on the tasks related to a visual rewind feature, e.g., in other to reduce any perceived negative effect on the performance of the image editing application when this feature is enabled. For example, in order to reduce memory and bandwidth requirements, the system may be configured to compress the captured image data, and in order to reduce the effect of the compression on the overall performance of the application (and/or to avoid dropping frames in the captured sequences), the system may be configured to perform the compression in real time.

In some embodiments, these considerations may be addressed by configuring the system such that as much of the capturing and/or compression work as possible is performed using the GPU, reducing the CPU workload and also the GPU/CPU data transfer rates. In some embodiments, the particular compression techniques applied may be dependent on application requirements during runtime. For example, the system may be configured to employ a lossless or near lossless compression technique when processing frames designated as key frames, in some embodiments.

Figure 4:
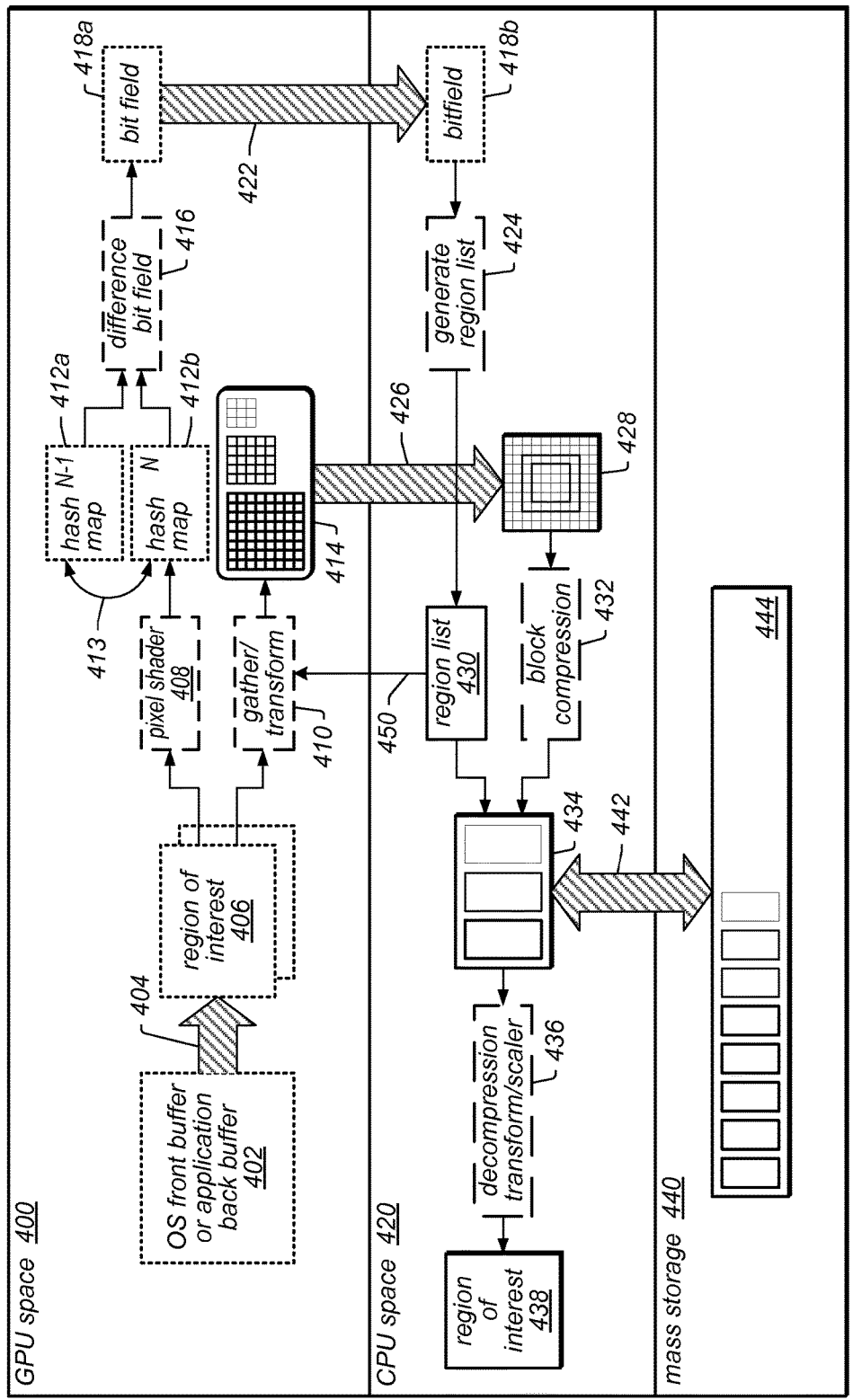
FIG. 4 is a block diagram illustrating various components and operations of a system configured to capture and store data usable in a visual rewind operation of an image editing application, according to one embodiment.

A block diagram illustrating various components and operations of a system configured to capture and store data usable in a visual rewind operation is illustrated in FIG. 4, according to one embodiment. As shown in this example, the system may include a GPU space (in which GPU functions are executed and/or store and access data), a CPU space (in which CPU functions are executed and/or store and access data), and/or mass storage. As illustrated in FIG. 4, this system may in various embodiments include any or all of the following components:

- A frame buffer 402. This frame buffer may represent a front buffer in which data destined to be sent to a display device for viewing by the user is stored in the GPU space (e.g., on a graphics card), or a back buffer, in which an image application renders its application canvas, in different embodiments.
- A memory transfer operation 404, which may in some embodiments employ a double buffering mechanism.
- A structure 406 that is large enough to store image data for the entire region of interest (e.g., up to the size of the application canvas).

Pixel shader code 408, which is configured to transform a 4×4 array of the image data (16 pixels) into a 32-bit hash. In some embodiments, the hashing function may use a 4×4 multiplicative pattern, and may store the resulting fractional result into the alpha channel of an ARGB space result.

A double buffer (shown as 412a and 412b) configured to hold the hash map for the current frame and the hash map for the previous frame. In some embodiments, storing a hash map for each frame rather than all of the image data for the entire frame or for the region of interest may reduce the storage requirements by a factor of 16.

A buffer swapping operation 413, which may be performed after each pixel shading operation 408 to identify the buffer 412 that previously held the current hash map as now holding the previous hash map, and allowing the newly created hash map to be stored in the other buffer, now designated as the current hash map. For example, in some embodiments, a "current" pointer and a "previous" pointer may be used to identify which of the two buffers 412 holds the most recent hash map, and the buffer swapping operation may cause the pointer values to alternate, so that they alternate between the two buffers, effectively swapping their functions.

Pixel shader code 416, which is configured to generate a difference map, identifying which 4×4 regions of the image have changed between the current and previous frames. For example, in some embodiments, each bit in the different map may represent one of the 4×4 regions in the hash map, and the value of the bit may indicate whether or not the pixel values that 4×4 region have changed since the previous frame.

A buffer 418a, configured to store the difference map (e.g., a difference bit field).

A transfer operation 422, by which the bit field stored in 418a is accessible to the CPU.

A CPU function 424, configured to build an optimal region list from the bit field, representing the regions of the image that have changed since the previous frame.

A buffer 430 used by the GPU and CPU to pack and unpack the region of interest.

A pixel shader 410, configured to gather 4×4 pixel blocks from the region of interest to packet buffers. In some embodiments, this shader may also be configured to perform a color space transform or another compression technique to reduce the amount of data to be stored. For example, pixel shader 410 may be configured to transform the data from a RGB color space to a YUV color space (which requires fewer bits), and/or to apply another compression technique to the data.

A transfer operation 450, by which the region list is made accessible to pixel shader 410.

Local video storage 414, configured to store the packed frame. In some embodiments, some or all of this storage may be pre-allocated in blocks of various sizes.

A transfer operation 426, by which the packed video data is made available to the CPU.

A compression operation 432, by which the packed data is further compressed by the CPU.

A data structure 434 in system memory, configured to store the compressed packets along with their unpacking information.

A decompression transformer/scaler operation 436, configured to uncompress, un-transform (e.g., apply an inverse transform), and unpack the compressed packets to recreate the canvas.

As destination canvas 438, for receiving the recreated region of interest.

A mass storage device 440, in which long frame sequences may be stored in one or more data structures 444 configured to store the applicable data.

A transfer operation 442, by which frames and/or compressed frame data may be read from mass storage device 440.

A method for compressing data usable in a visual rewind operation of an image editing application (e.g., in the system illustrated in FIG. 4) is illustrated in FIG. 5, according to various embodiments. As shown in 500 of FIG. 5, the method may include copying (e.g. using transfer operation 404) the region of interest from a front or back buffer (402) to a local video memory buffer (406). In some embodiments in which the region of interest is copied from a front buffer, this may constitute a low impact operation (in terms of its impact on the operating system).

As shown in 510 of FIG. 5, the method may include computing a hash of a 4×4 region (e.g., using pixel shader 408), and storing the result in a double buffered hash map buffer (412), as described above. As previously noted, this hashing operation may use a 4×4 modulation pattern and may store the fractional portion of the result in one of the channels (e.g., the alpha channel in the ARGB space). As described above, the buffers 412a and 412b may be swapped after each new computation, such that the one previously storing the most recent hash result (which was designated as the current hash map) is designated as now holding a previous result and the one previously storing a previous hash result (and designated as such) is now used to store the result of the new computation (as is designated as storing the current hash map). In some embodiments, the hash may be computed and stored in the hash map buffer when the data for the region of interest is captured, rather than in a separate operation.

As shown in 520 of FIG. 5, the method may include generating a difference map (418a) from the hash maps of the current and the previously captured frames (e.g., using pixel shader code 416). As described above, this difference map may comprise a bit field in which each bit indicates whether pixels values for a corresponding 4×4 pixel block of the image (or the region of interest) changed between the current and previously captured frames.

As shown in 530 of FIG. 5, the method may include transferring (e.g., using transfer operation 422) the difference map (bit field 418a) to the CPU (shown as 418b) to be used in generating a region change list (e.g., generated by a CPU function 424 configured to generate the region change list). As shown in 540, the method may include executing a gather operation (e.g., using pixel shader 410) from the region of interest buffer (406), and storing the gathered data in an appropriately sized block in the video storage (414) for transfer to the CPU. Note that in this example, pixel shader 410 uses region list 430, made available by transfer operation 450, to pack the changes. As described above, the gather operation may be configured to select the smallest subset of the image data needed to represent the set of pixels that have changed between the current and previous frames, and may in some embodiments be configured to further compress the selected data (e.g., using a color space transformation or another compression technique). In some embodiments, the block selected for storage in the video storage (414) is the smallest block that is large enough to hold the changed data set.

As shown in 550 of FIG. 5, the method may include transferring the gathered (and optionally compacted) changes to the CPU (e.g., using a transfer operation 426). In some embodiments, the CPU may further compress the data received using any suitable technique to reduce the amount of data to be stored and/or processed (e.g., a color space transform, a down sampling operation, a conversion to another format such as JPEG, etc.) This is illustrated in FIG. 4 as block compression operation 432.

As shown in 560 of FIG. 5, the method may include recording (e.g., in a data structure 434) the region list (previously stored in a buffer 430) with the compressed data (e.g., data produced by block compression operation 432) in order to maintain a history of regions that have changed. As shown in 570 of FIG. 5, if and when the local history record is full, the method may include storing the compacted frame data to a data structure (such as 444) in mass storage (440). As shown in 580 of FIG. 5, in order to display an image from the compressed data generated as described above, the method may include reversing the compression steps that were applied to the image data and scattering the changes (e.g., using a decompression transformer/scaler operation 436) to a destination canvas (438). In some embodiments, frames (and/or compressed frame data) may be read from mass storage (e.g., using transfer operation 442). For example, data representing key frames may be read from mass storage, in some embodiments.

As described herein, in an image editing application that supports a visual rewind operation, it may be beneficial to reduce the computation, storage, and bandwidth requirements for the image data captured and stored in the system in order to reduce the impact of the operations described herein on the overall performance of the image editing application. As described herein, various techniques may be applied to the image data at different points in the work flow in order to reduce the amount of data being stored, transferred, and/or processed, including (but not limited to) those described herein. Each of these techniques may contribute to a reduction in the amount of image data maintained in the system. In one example, for a 1024×768 canvas in an RGB color space, there may be 3Mbytes of data in the region of interest buffer. The hashing technique described herein may reduce the data to 192Kbytes×2 (since it is double-buffered), and the generation of the difference bit field may reduce the down to 6Kbytes. This 6Kbytes of data may be all that is transferred to the CPU for the generation of a region list associated with a packed frame, as described above. In another example, transforming the color space of an image from RGB space to YUV space and sub-sampling the chroma to a 4:2:0 format may result in a 2.66:1 compression over the raw 8 bit RGB format. Another compression technique may include applying a min/max interpolation method on the luminance, bringing the compression ratio to 3.55:1. In one example, this may be done by using 4 bits to interpolate between the recorded min/max values in each block. In some embodiments, down sampling may also be used, providing a 2× or 4× compression (or more). In some embodiments, buffers for storing the compressed image data may be pre-allocated in various sizes (e.g., 512×512, 128×128, and 64×64), and may be selected for use according to the required packed size.

In some embodiments, by using multiple frames worth of bit field information, it may be possible to deliver adaptive compression that maps well to different use models in image editing applications. For example, in the case that an image editing operation causes the entire workspace to change visual state (e.g., interactively rotating the canvas or performing a full frame color correction), the system may be configured to reduce the resolution of the image data displayed and/or captured during the 'animation', but the last frame, reflecting the final state of the canvas after the operation is performed, may be captured at full resolution. In some embodiments, this adaptation may be achieved without the need for application-context feedback. However, the application may control and provide hints to the process of capturing particular frames at a higher or lower data rates to match the editing context. For example, the system may be configured to record all frames that match the timestamp of an operation (e.g., a timestamp recorded at the begin or end of a brush stroke, or a timestamp recorded in the standard undo/redo queue for a discrete operation) at maximum resolution.

In some embodiments, once the data is packed and accessible to the CPU, additional compression techniques may be applied. For example, various variable rate compression schemes may be used to reduce the size of the data. In some embodiments, the data may be compressed in its packet format using multiple strategies, e.g., a DCT/quantization/entropy encoding method may be used for blocks that fit a natural images profile. The data may be kept in this format until required for visual inspection. If a DCT (discrete cosine transform) method is applied on all blocks, the compression for near visual lossless results may deliver a compression ratio of about 5:1 when a 4:2:0 color space is used. In one embodiment, a typical image editing session on a system that includes a 64Mbyte buffer may be able to store between 30 seconds of data during intense editing (e.g., editing that includes constant full canvas changes) and 5 minutes, when performing 'common' edits. Using mass storage, the system may be able to capture hour-long editing sessions, in some embodiments.

In various embodiments, a graphics application (e.g., an image editing application or another graphics application that includes image editing functionality) may provide input mechanisms with which the user may indicate selection of (and/or parameter values for) a number of image editing operations, including operations supporting a visual rewind capability. FIGS. 6A-6D illustrate a graphical user interface of a graphics application configured to provide functionality for capturing and storing image data and interaction logs, and using the stored information in a visual rewind operation, according to various embodiments. As shown in this example, the graphical user interface (GUI), may present selection tools, slider bars, pop-up menus, pull-down menus, dials, alphanumeric text entry boxes, or other mechanisms for identifying image editing operations to be invoked and/or for specifying values or relative values of various configurable parameters. For example, FIGS. 6A-6D illustrate a GUI of an image editing application (or an image editing module of another graphics application) that may provide mechanisms for a user to apply the image capturing, interaction logging, visual rewinding, and partial operation undo techniques described herein and to adjust one or more parameters of these operations, according to one embodiment. In this example, an image editing module may provide a selection tool and one or more user interface elements whereby a user may select and control the capture of image data and interaction log data during performance of one or more image editing operations, the replay of an animation depicting the effects of those operations in reverse order, and the generation or reconstruction of an image representing the partial undo of an operation, as described herein. The user interface may also provide user interface elements for controlling various aspects of other image editing operations and/or for performing other image editing tasks. The user interface illustrated in FIGS. 6A-6D is provided as an example of one possible implementation, and is not intended to be limiting.

Figure 6A:
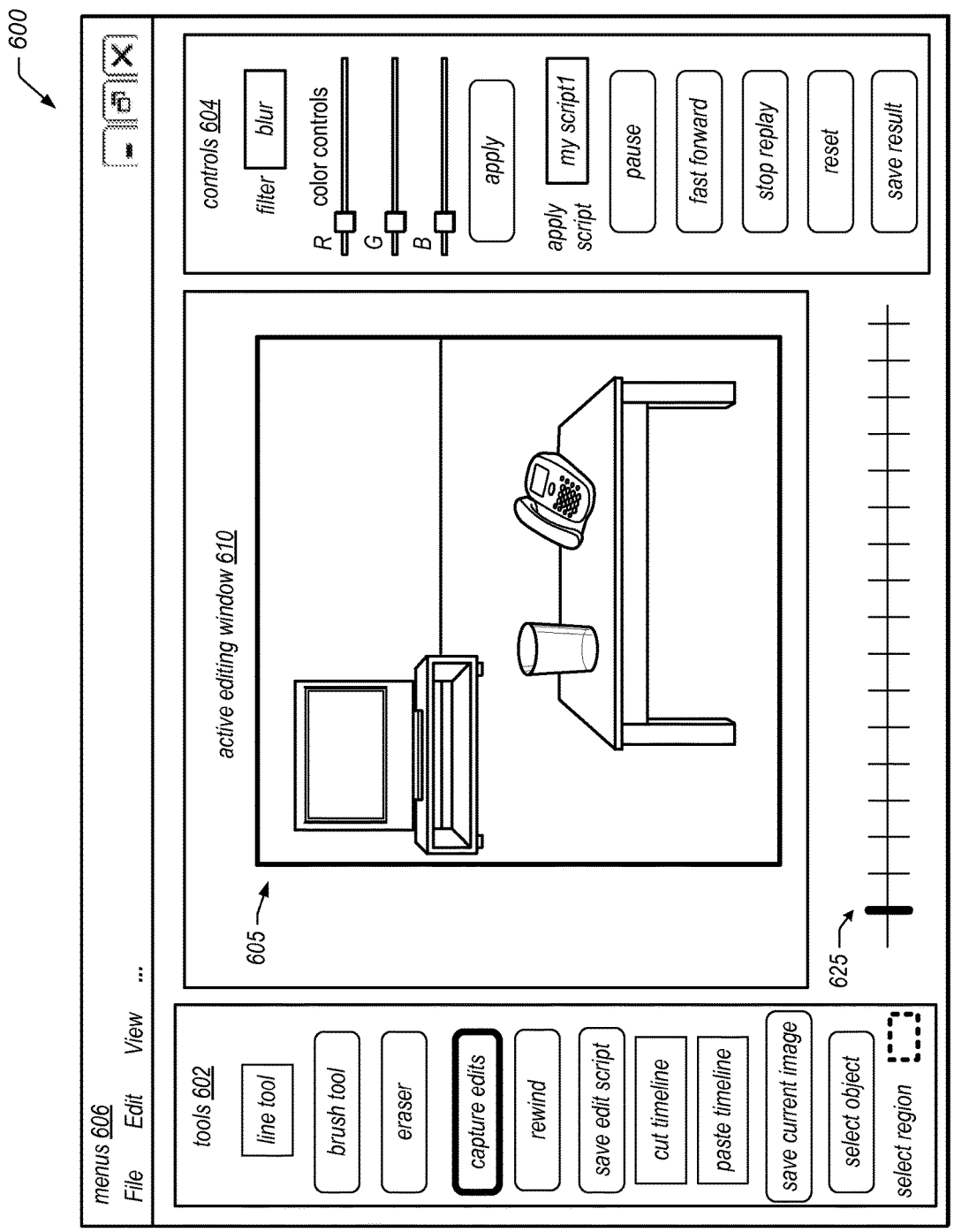
FIGS. 6A-6D illustrate a graphical user interface of an image editing application that includes visual rewind capability, according to some embodiments.

FIG. 6A illustrates an example display 600 depicting various frames that may be visible to a user during an image editing operation. In this example, the display is divided into four regions or areas: menus 606, tools 602, controls 604, and active editing window 610. In this example, an input image 605, on which various image editing operations are to be applied, is displayed in active editing window 610. As shown in FIG. 6A, tools area 602 may include one or more user-selectable user interface elements. In this example, it is this area that contains the user interface elements that a user may select to apply various operations (e.g., drawing using a line tool or brush tool, erasing an object or portion thereof, capturing data during editing, rewinding an editing operation, saving an editing script, cutting and/or pasting from a timeline of editing operations, saving a current displayed imaged, or selecting an object or a region on which to operate) when editing an image.

As shown in the example illustrated in FIG. 6A, the user may select an operation to initiate the capturing of image editing information, as described herein (e.g., "capture edits"). In some embodiments, selection of an operation to "capture edits" may cause the application to enter a mode in which image data is captured during image editing operations and in which interactions and corresponding application state changes are logged during performance of those image editing operations. In response to the user selecting "capture edits" in tools area 602, the image editing application may be configured to enter an edit capturing mode and to begin capturing this information for subsequent image editing operations, as described above, and may buffer and/or store information associated with multiple image editing operations for a pre-determined amount of time, for a pre-determined number of interaction log entries, or for a pre-determined number of image changes in a sliding window (e.g., until data structures for storing the information are full, at which point new data may be stored and the oldest data may be removed). In various embodiments, the amount of time for which edits are to be captured, the number of interaction log entries to be stored, and/or the number of image changes to be captured and tracked may be specified by the user (not shown) or may be default values, application-specific values, or operation-specific values.

FIG. 6A illustrates the selection of "capture edits" (shown in FIG. 6A by the bold boundary around the item "capture edits"). In response to invoking this feature, the image editing application may also be configured to display a timeline 625, indicating (by a bold mark) which of a sequence of frames currently captured is being displayed, as identified by a timestamp and/or frame number along timeline 625. In this example, since no image editing operations have been performed since the invocation of the "capture edits" feature, the first mark on timeline 625 is indicated in bold, representing that no edits have been captured yet for the input image 605 currently being displayed in active editing window 610. In this example, the image being displayed in active editing window 610 may be stored as a key frame when building an animation during the performance of any subsequent image editing operations performed while the "capture edits" feature remains active.

Figure 6B:
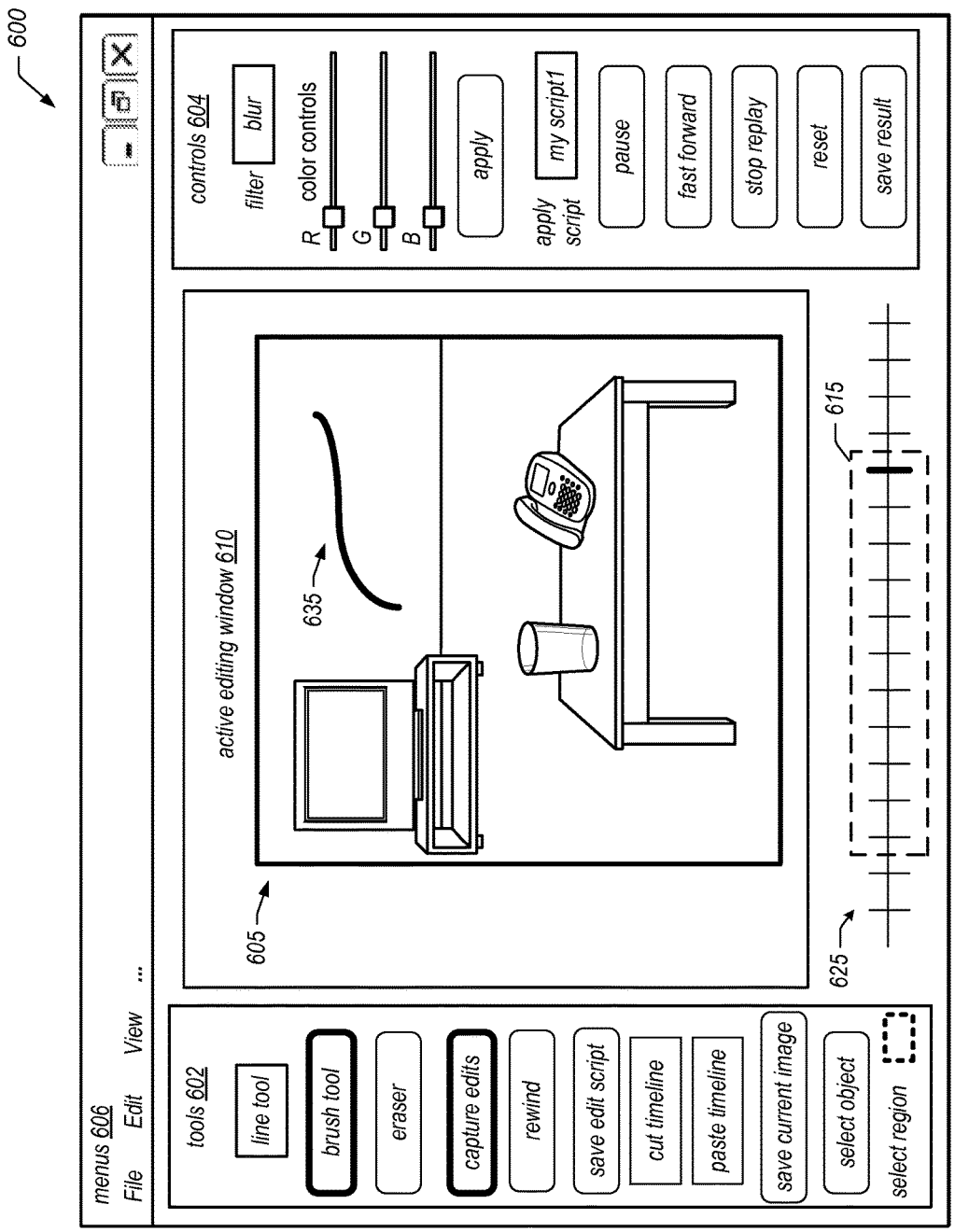

As noted above, the systems and methods described herein may support a variety of image editing operations, for which the interactions and corresponding image changes and application state changes may be captured and/or logged. For example, FIG. 6B illustrates the selection of drawing operation using a brush tool (shown in FIG. 6B by the bold boundary around the "brush tool" element in tools area 602). In the example illustrated in FIG. 6B, the user has applied the brush tool to draw a wide, curved line 635 in image 605, displayed in active editing window 610. In this example, since the element "capture edits" in tools area 602 is currently selected, image data representing the frames displayed as the curved line 635 is drawn by the user (or representing the changes between frames displayed during this operation) may be captured and stored along with respective frame identifiers, as described herein. In some embodiments, any number of compression techniques may be applied to the captured information, including those described herein, or any other suitable data reduction technique.

As shown in FIG. 6B, in some embodiments, as image editing operations are performed, a sliding window 615 may indicate the portion of timeline 625 for which image data and interaction logs are currently stored. As in FIG. 6A, the bold mark on timeline 625 may indicate the timestamp and/or frame identifier of the frame of the animation being built that corresponds to the version of image 605 currently displayed in active editing window 610. Note that data representing a large number of frames may be captured even when the sliding window 615 represents a small amount of time. For example, if the sliding window represents two minutes of an editing session and the system displays 60 frames per second, data representing changes in up to 7200 frames may be captured by the system. Therefore, each of the individual marks on timeline 625 may not represent a single frame, but may represent any number of frames (e.g., 50, 100, or more). In various embodiments, the system may not capture or record information about every frame displayed during image editing, but only those for which image data has changed. Therefore, the markers displayed in timeline 625 may not represents all frames in a sequence and may not correspond to frames that are equally spaced within the sequence.

Figure 6C:
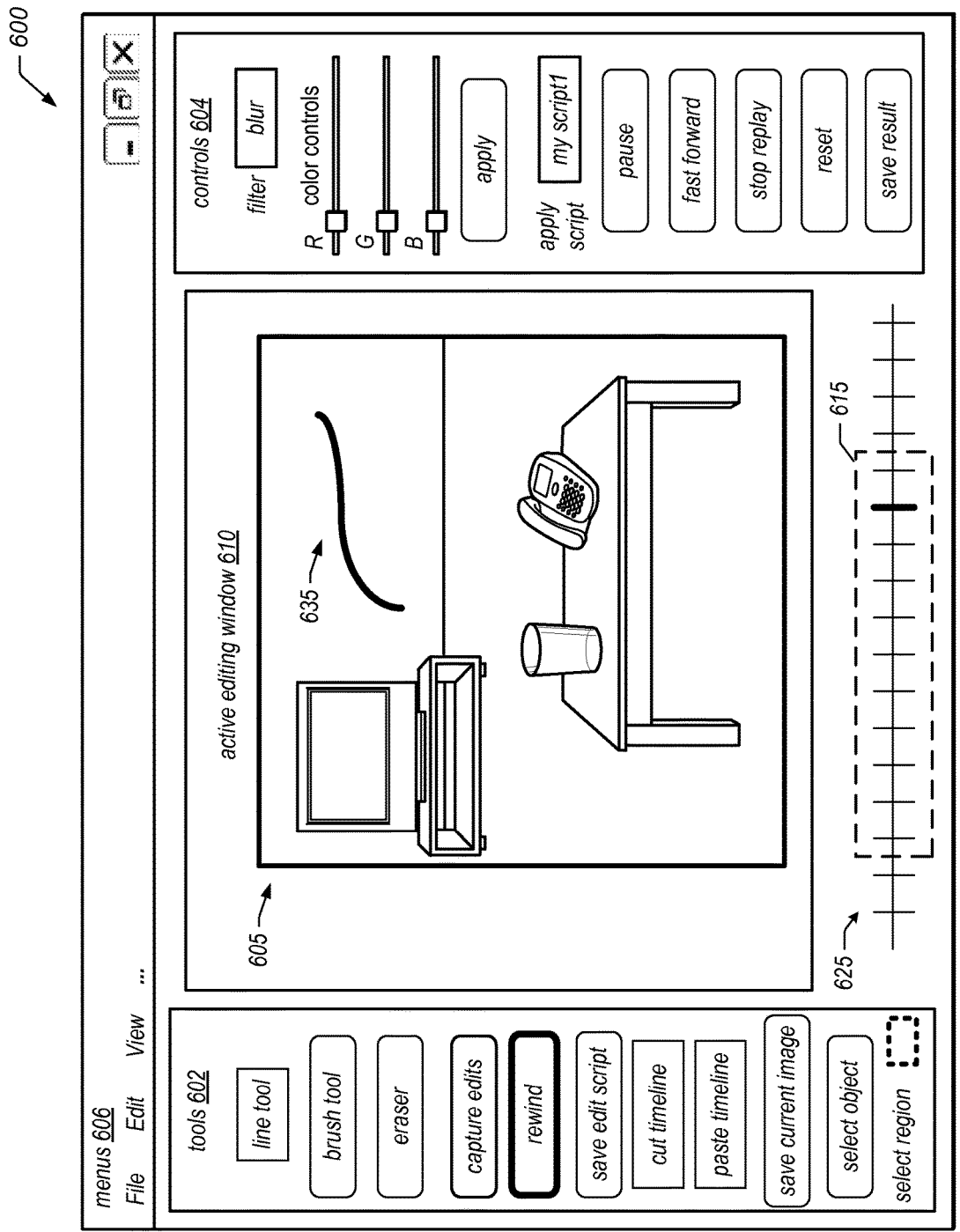

As described herein, the image editing application may in some embodiments provide a mechanism to allow the user to invoke a visual rewind operation if the user wants to undo an image editing operation in a collection of atomically applied operations, or a portion of an image editing operation. The image editing application may provide mechanisms to allow the user to navigate to the point in the animation displayed by the visual rewind operation corresponding to the image state to which the user wants to return. FIG. 6C illustrates the invocation of a visual rewind operation (shown as the "rewind" element outlined in bold in tools area 602). In this example, the "rewind" operation and the "capture edits" feature cannot be active at the same time. Therefore, once the "rewind" operation is selected, the "capture edits" feature and any other active editing tools unrelated to the visual rewind feature (e.g., drawing or color-correction tools) are disabled for the duration of the rewind operation. In response to selection of the visual rewind operation, the image editing application may be configured to begin displaying the captured sequence of frames in reverse order in active editing window 610. In this example, as the animation is "rewound", the frame currently displayed in active editing window 610 may be indicated on timeline 625 by a bold mark within sliding window 615.

This is shown in FIG. 6C as the bold mark indicated well before the far right end of sliding window 615.

Figure 6D:
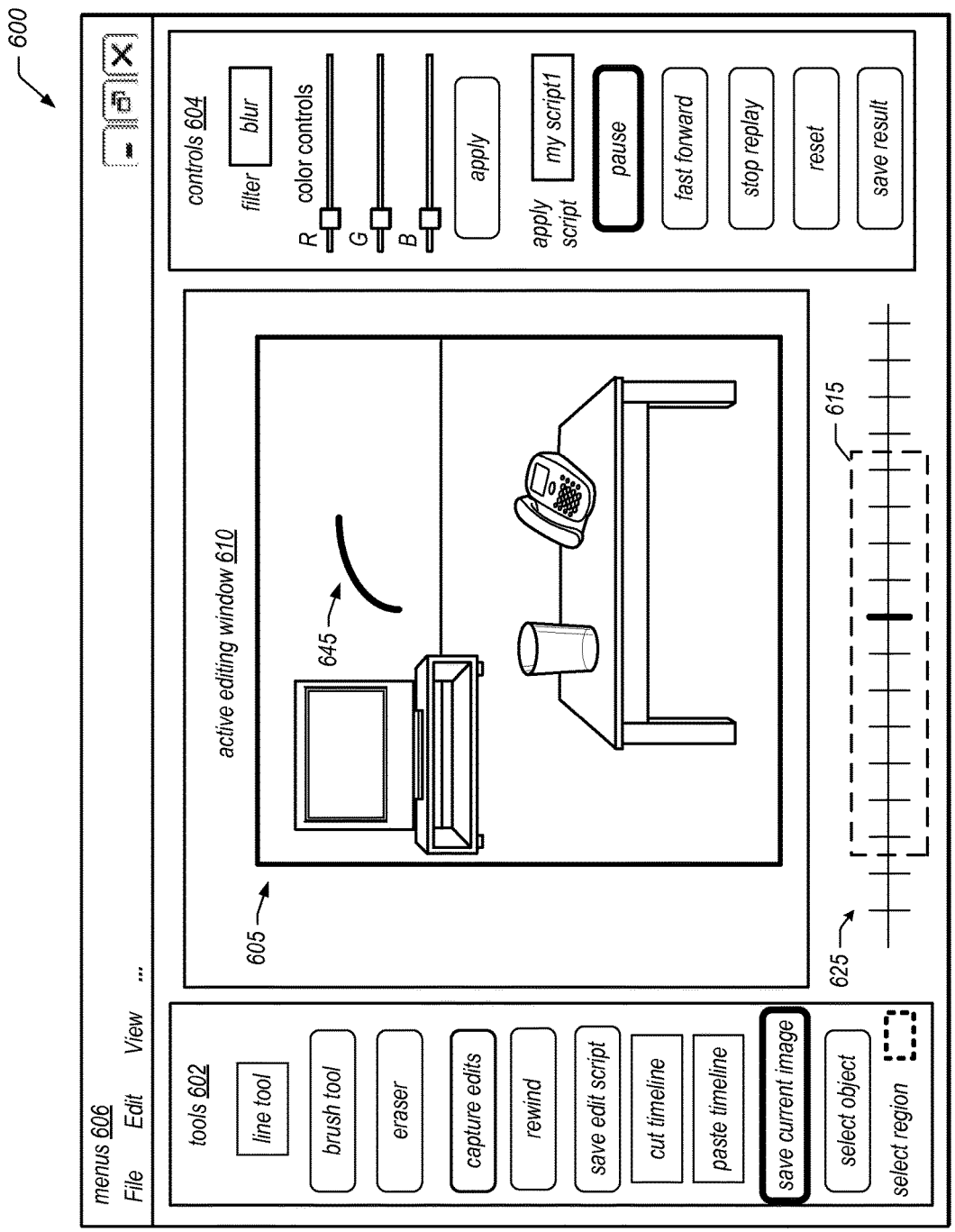

As previously noted, in some embodiments, the system may be configured to allow the user to iteratively pause, fast forward, fast reverse, and/or rewind the animation until the user determines the image state to which the application should be returned. While mechanisms to invoke these navigation functions are illustrated in FIGS. 6A-6D as buttons in tools area 602 and controls area 604, in other embodiments, they may be presented as icons representing analogous buttons on a video or audio player (e.g., forward or backward arrows, etc.) As illustrated in FIG. 6D, once the user has navigated to the frame that represents the image state the user wants to return to, the user may select a "pause" operation in controls area 604. In this example, the version of image 605 currently displayed in active editing window 610 depicts the state of image 605 in the middle of a drawing operation (i.e. in the middle of the brush stroke that created line 635 of FIGS. 6B and 6C). This is shown as the partial line 645 drawn in image 605 in FIG. 6D. If this is the image state to which the user wants to return, and if the user wishes to save this version of image 605 (e.g., for archiving and/or for subsequent editing) the user may do so by selecting the "save current image" element in tools area 602. In response to invocation of the "save current image" operation, the image editing application may be configured to generate or reconstruct the state of image 605 depicted in active editing window 610 at that point, dependent on the image data, interaction logs, and other data saved while the "capture edits" feature was active, as described herein. As described herein, in some embodiments generating or reconstructing the image state may include applying one or more inverse transforms and/or decompression techniques to the stored data.

Note that in some embodiments, when re-constructing the image state following a visual rewind operation, the system may be configured to display an indication that the image state has been rewound to a point at which an atomic editing operation has only been partially completed (e.g., by a fading or other parameterized composite blend of the complete operation and the partial operation). For example, a user may begin drawing a rectangle at time A, and finish drawing the rectangle at time B. In this example, the drawing of the rectangle may be atomic; therefore a partial undo may not be available. If the user applies a visual rewind operation to return to an image state between time A and time B, rather than not displaying the rectangle in the re-constructed image at all, the system may be configured to display the originally drawn rectangle with an opacity representing how close to time B the current image state is. For example, if the rectangle was original drawn as fully opaque, and the current state is halfway between A and B, the image state may be re-constructed such that the rectangle is displayed with 50% opacity.

In some embodiments, as the animation is built, the system may use information about the target location of each image editing operation to include hints about the region of interest for a given operation in the captured image data and/or interaction logs. For example, by storing information indicating the portion of the image in which changes are made, the system may support a highlighting feature when the animation is replayed, e.g., by adding a shading or lighting effect in the portion of the image where changes are being made in a sequence of frames. Such a highlighting feature may assist a user in more quickly identifying changes that the user does or does not wish to undo.

While FIGS. 6A-6D illustrate several of the elements in tools area 602 and 604 as radio buttons, text entry boxes, or slider bars, other types of user interface elements, such as pop-up menus, or pull-down menus, may be used to select from among one or more tools in various embodiments. In various embodiments, the reset tool illustrated in controls area 604 in FIGS. 6A-6D may or may not be included in the user interface. A reset tool may in some embodiments be used to reset an atomic collection of image adjustments, such as a collection of color adjustments made by changing positions of the R, G, and B slider bars in controls area 604 that have been previewed in active editing window 610. Similarly, the "apply" button may be used to commit the previewed results of an atomic collection of image adjustments if these results are acceptable. In some embodiments, when an atomic collection of image adjustments is committed, the image editing application may be configured to capture the resulting image state as a key frame. Various embodiments may include other tools not shown, as well, such as a standard "undo" tool that undoes the most recent discrete user action applied in active editing window 610. In various embodiments, controls area 604 may include other input mechanisms such as additional pull-down menus, pop-up menus, slider bars, or other mechanisms usable to specify values of other configurable parameters for any of the image editing functions provided by the graphics application.

In some embodiments, various operations (such as those illustrated in FIGS. 6A-6D and described above) may produce captured image data, interaction logs, and/or modified image data stored in an output file in the same folder as the input image, or an output file whose name and/or location are specified using the "File" element in menus area 606. In some embodiments, a user may be able to specify a file name or other location at which the results (e.g., captured data image data, interaction logs, and/or one or more resulting output images) should be stored, using the "File" element of menu area 606, in this example.

In the example illustrated in FIGS. 6A-6D, menus 606 may include one or more menus, for example menus used to navigate to other displays in the image editing application, open files, display or save files, undo/redo discrete actions, view one or more selected versions or representations of an image, and so on. In some embodiments, an image file (e.g., an input or output file containing image data and metadata associated with an image), an editing script file, or a file containing data representing one of several alternate image editing results may be identified by the user through the "File" option in menu area 606. This menu item may include, for example, a user-selectable pull-down option for importing one or more scripts, or one or more images or versions thereof from an identified file and/or for specifying and name and/or location of an output file, as described above. In some embodiments, a selection box in controls area 604 may be used to select one of a plurality of available editing scripts to be applied to an image being editing in active editing window 610. For example, in FIGS. 6A-6D, this selection box contains an entry "my script1" although the script is not selected for application to image 605.

In the example illustrated in FIGS. 6A-6D, active editing window 610 is the area in which an image being edited is displayed as various editing operations are performed, and in which an animation is displayed during a visual rewind operation. In various embodiments and at various times, active editing window 610 may display a portion of an input image to which an editing operation is to be applied, an animation being replayed in forward or reverse order, or a portion of a resulting (modified) image, an output image, or any intermediate image produced as part of an image editing operation, as described herein.

In the example illustrated in FIGS. 6A-6D, menu 606 includes a "view" option. This menu item may include, for example, a user-selectable pull-down or pop-up menu usable to select which of various representations of an image (e.g., an input image, a stored animation depicting one or more image editing operations, etc.) are displayed in active editing window 610, or in another area of display 600. In other embodiments, different input mechanisms may be provided for selecting a view to be displayed, such as one or more radio buttons, alphanumeric text boxes, dials, etc. In some embodiments, one of the available viewing options may be a "split view", in which two or more representations of an image may be simultaneously displayed (e.g., an output image depicting the results of two or more editing operations and an animation depicting the incremental changes made during performance of those editing operations may be simultaneously displayed). In some embodiments, as the user iteratively applies various image editing operations, the system may be configured to automatically refresh the image 605 and a preview image of a modified version of image 605 being displayed in response to these updates, and to automatically capture and/or store data representing the these preview images as an animation, as described herein.

In some embodiments, a user may be prompted to provide one or more of the inputs described above in response to invoking an operation of the graphics application. In other embodiments, the graphics application may provide default values, application-specific values, and/or operation-specific values for any or all of these inputs. In some embodiments, the user may be allowed to override one or more default parameter values using an interface similar to that illustrated in FIGS. 6A-6D.

In some embodiments, if the user selects one of the operations invoked through the mechanisms in tools area 602, the user may be prompted to select an object or a portion of the input image 605 being edited in active editing window 610 on which to apply the operation. For example, the user may apply a selection tool of tools area 602 to identify an object in the image on which to apply the selected operation. In another example, the user may select a portion of image 605 by defining a window around the selection using the selection tool of tools area 602 (e.g., using a mouse, touch pad, keyboard, track ball, etc. to move a cursor across the timeline image to draw the bounding box). In some embodiments, the selected portion of the image may be displayed in active editing window 610 in response to its selection, or an indication of its selection (e.g., bounding box 625) may be displayed as if overlaid on image 605 in window 610. In some embodiments, in response to selection of an image editing operation, such as those described herein, the graphics application may be configured to apply the selected operation to the portion of image 605 identified by bounding box 625. In some embodiments, if an image editing operation is applied to a selected object or portion of an image, the image editing application may provide data indicating the selection to the interaction log generation process as a hint about the region of interest in the corresponding animation frames.

Note that in some embodiments, the image editing application may support the direct manipulation of timeline 625 instead of, or in addition to, providing rewind, pause, forward, and/or stop buttons. In such embodiments, the user may be able to select the bold mark on the timeline indicating the current image state (e.g., by clicking it) and drag it to a new location on the timeline. As the user drags the marker along the timeline, the captured frames corresponding to the locations it passes along the timeline may be displayed. In this example, when the user stops dragging the marker, the image data corresponding to the frame being displayed may be re-constructed as described herein.

Some embodiments of the system described herein may include a means for capturing and recording the interactions and corresponding application and state changes during image editing operations. For example, an image editing log generator may receive indications from a GUI of an image editing application of interactions performed, may receive data from the image editing application indicating changes in the application or image state, may determine a correlation between frames displayed in the image editing application during performance of image editing operations, and may store the captured data and data representing the determined correlations in entries of an interaction log for later use, as described in detail herein. The image editing log generator may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform receiving indications from a GUI of an image editing application of interactions performed, receiving data from the image editing application indicating changes in the application or image state, determining a correlation between frames displayed in the image editing application during performance of image editing operations, and storing the captured data and data representing the determined correlations in entries of an interaction log for later use, as described in detail herein. Other embodiments of the image editing log generator may be at least partially implemented by hardware circuitry and/or firmware stored, for example, in a non-volatile memory.

Some embodiments of the system described herein may include a means for capturing image data representing changes to an image during performance of one or more image editing operations. For example, an image data capture module may copy image data from a frame buffer, may perform a data compression operation on the copied image data, may determine any differences between a current frame and a previous frame, may store the captured data and/or data representing the determined changes in the image frames for use in building an animation, and/or may send all or a portion of the stored data to another component in the system for later use, as described in detail herein. The image data capture module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform copying image data from a frame buffer, performing a data compression operation on the copied image data, determining any differences between a current frame and a previous frame, storing the captured data and/or data representing the determined changes in the image frames for use in building an animation, and/or sending all or a portion of the stored data to another component in the system for later use, as described in detail herein. Other embodiments of the image data capture module may be at least partially implemented by hardware circuitry and/or firmware stored, for example, in a non-volatile memory.

Some embodiments of the system described herein may include a means for compressing the image data captured during image editing operations. For example, an image data compressor may perform a hash of the captured image data, may perform a color space transform of the captured image data, may perform a conversion of the image data to another image data format (e.g., JPEG), and/or may store the compressed data for later use, as described in detail herein. The image data compressor may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform a hash of the captured image data, to perform a color space transform of the captured image data, to perform a conversion of the image data to another image data format, and/or to store the compressed data for later use, as described in detail herein. Other embodiments of the image data compressor may be at least partially implemented by hardware circuitry and/or firmware stored, for example, in a non-volatile memory.

Some embodiments of the system described herein may include a means for reconstructing image data that has been compressed. For example, an image data de-compressor may perform an inverse color transform on compressed data, may perform a conversion of compressed data to an original image data format, may perform a scatter operation on the compressed data, and may store the decompressed image data as a reconstructed output image, as described in detail herein. The image data de-compressor may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform an inverse color transform on compressed data, to perform a conversion of compressed data to an original image data format, to perform a scatter operation on the compressed data, and to store the decompressed image data as a reconstructed output image, as described in detail herein. Other embodiments of the image data de-compressor may be at least partially implemented by hardware circuitry and/or firmware stored, for example, in a non-volatile memory.

Figure 7:
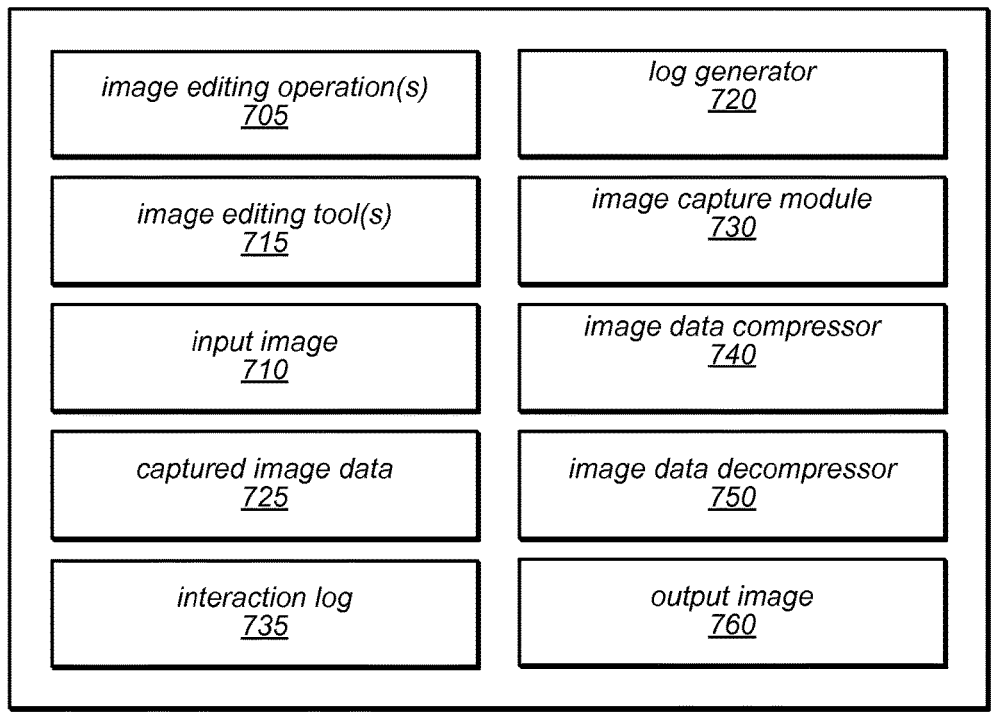
FIG. 7 is a block diagram illustrating an embodiment of a digital image editing program configured for capturing and storing image data and interaction logs, and for using the stored information in a visual rewind operation.

FIG. 7 is a block diagram illustrating an embodiment of a digital image editing application (or an image editing application of a graphics application) configured for capturing and storing image data and interaction logs, and for using the stored information in a visual rewind operation, as described herein. In this example, digital image editing program 700 may comprise one or more image editing operations 705 and may provide one or more image editing tools 715. In one embodiment, a suitable product such as Adobe Photoshop®, Adobe Illustrator®, or Adobe AfterEffects® (all available from Adobe Systems, Inc.) may be used as the image editing program 700. The image editing program 700 may be used to create and/or modify a digital image 710. The image editing operations 705 and/or image editing tools 715 may comprise suitable operations for modifying pixels and/or geometric objects of the image 710. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to images (including selections within an image) using image editing program 700. In addition, interactions and corresponding changes in applicant and/or image state during performance of image editing operations may be captured using image editing program 700. As illustrated in FIG. 7, in some embodiments, image editing program 700 may be configured to access, generate, store, and/or operate on one or more images 710, and may be configured to generate and/or store one or more output images 760 as a result of various image editing operations, including visual rewind and. subsequent image generation or reconstruction operations, as described herein.

As illustrated in FIG. 7, in some embodiments, image editing program 700 may include a log generator 720, an image capture module 730, an image data compressor 740, and/or an image de-compressor 750. In various embodiments, any of these modules may be coded as an intrinsic part of the image editor 700 or as a plug-in module or other extension to the image editor 700. The image editing program 700 and its constituent elements and data may in some embodiments be stored in a memory of a computer system, shown as graphics application 920 in FIG. 9.

As described herein, in some embodiments, an image editing log generator 720 may be configured to receive indications from a GUI of an image editing application of interactions performed, to receive data from the image editing application indicating changes in the application or image state, to determine a correlation between frames displayed in the image editing application during performance of image editing operations, and/or to store the captured data and data representing the determined correlations in entries of an interaction log (such as interaction log 735 in FIG. 7) for later use.

As described herein, in some embodiments, an image data capture module 730 may be configured to copy image data from a frame buffer, to perform a data compression operation on the copied image data, to determine any differences between a current frame and a previous frame, to store the captured data and/or data representing the determined changes in the image frames (e.g., as captured image data 725 in FIG. 7) for use in building an animation, and/or to send all or a portion of the stored data to another component in the system for later use.

As described herein, in some embodiments, an image data compressor 740 may be configured to perform a hash of the captured image data, to perform a color space transform of the captured image data, to perform a conversion of the image data to another image data format (e.g., JPEG), and/or to store the compressed image data for later use. In some embodiments, the compressed image data may be stored as captured image data 725 instead of, or along with, the image data copied from the frame buffer by image capture module 730.

As described herein, in some embodiments, an image data de-compressor 750 may perform an inverse color transform on compressed data, may perform a conversion of compressed data to an original image data format, may perform a scatter operation on the compressed data, and may store the decompressed image data as a reconstructed output image 760. Output image 760 may in some embodiments be displayed to a user as a preview image. In various embodiments, output image 760 may be stored by image editing program 700 (e.g., in archival storage) for subsequent display and/or further processing.

Figure 8:
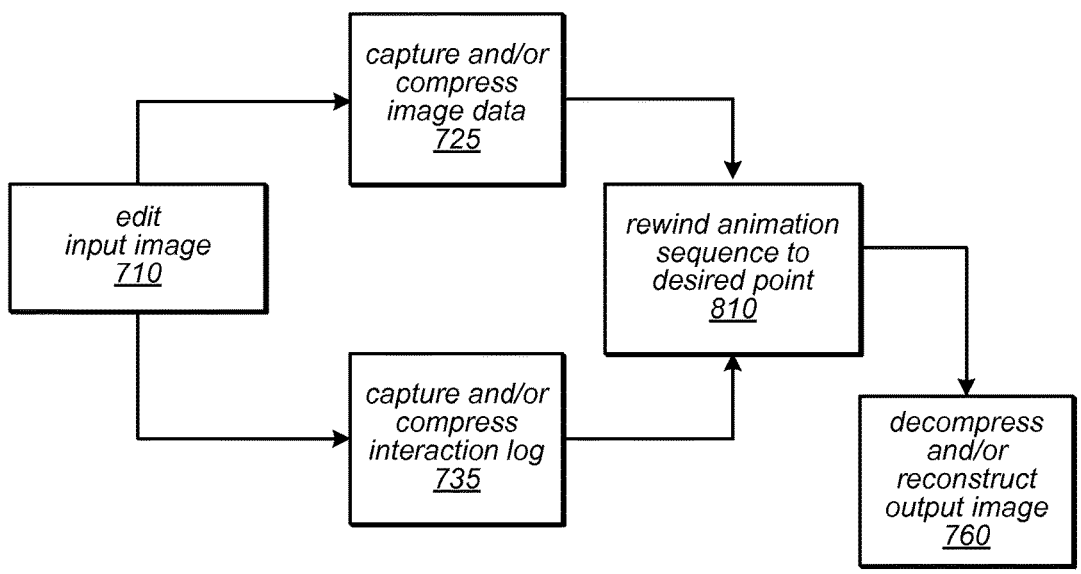
FIG. 8 illustrates a workflow associated with capturing and storing image data and interaction logs, and using the stored information in a visual rewind operation, according to various embodiments.

FIG. 8 illustrates a workflow associated with capturing and storing image data and interaction logs, and using the stored information in a visual rewind operation, according to one embodiment. As illustrated in FIG. 8, output image 760 may be generated, at least in part, based on an edited input image 710. In this example, input image 710 may be displayed and/or operation on by one of various tools of image editing program 700 (e.g. a GUI such as that illustrated in FIGS. 6A-6D). As illustrated in FIG. 8, image data 725 may be captured (e.g., by image capture module 730 of FIG. 7) and/or compressed (e.g., by image data compressor 740 of FIG. 7) during performance of various image editing operations on image 710, such as by one or more of image editing operations 705 of FIG. 7. As shown in this example, data to be stored in entries of an interaction log 735 may be captured and recorded (e.g., by log generator 720 of FIG. 7) and/or compressed (e.g., by log generator 720, image data compressor 740, or another module of image editing program 700).

As shown in this example, input image 710 may be modified (e.g., by various image editing operations 705) producing image data 725 and interaction log 735. As illustrated in 810 of FIG. 8, a visual rewind operation may be used to rewind an animation of the image editing operations to a desired point. Output image 760 may then be generated or reconstructed based on the captured image data 725 and interaction log 735 (e.g., by image data de-compressor 750 of FIG. 7).

Figure 9:
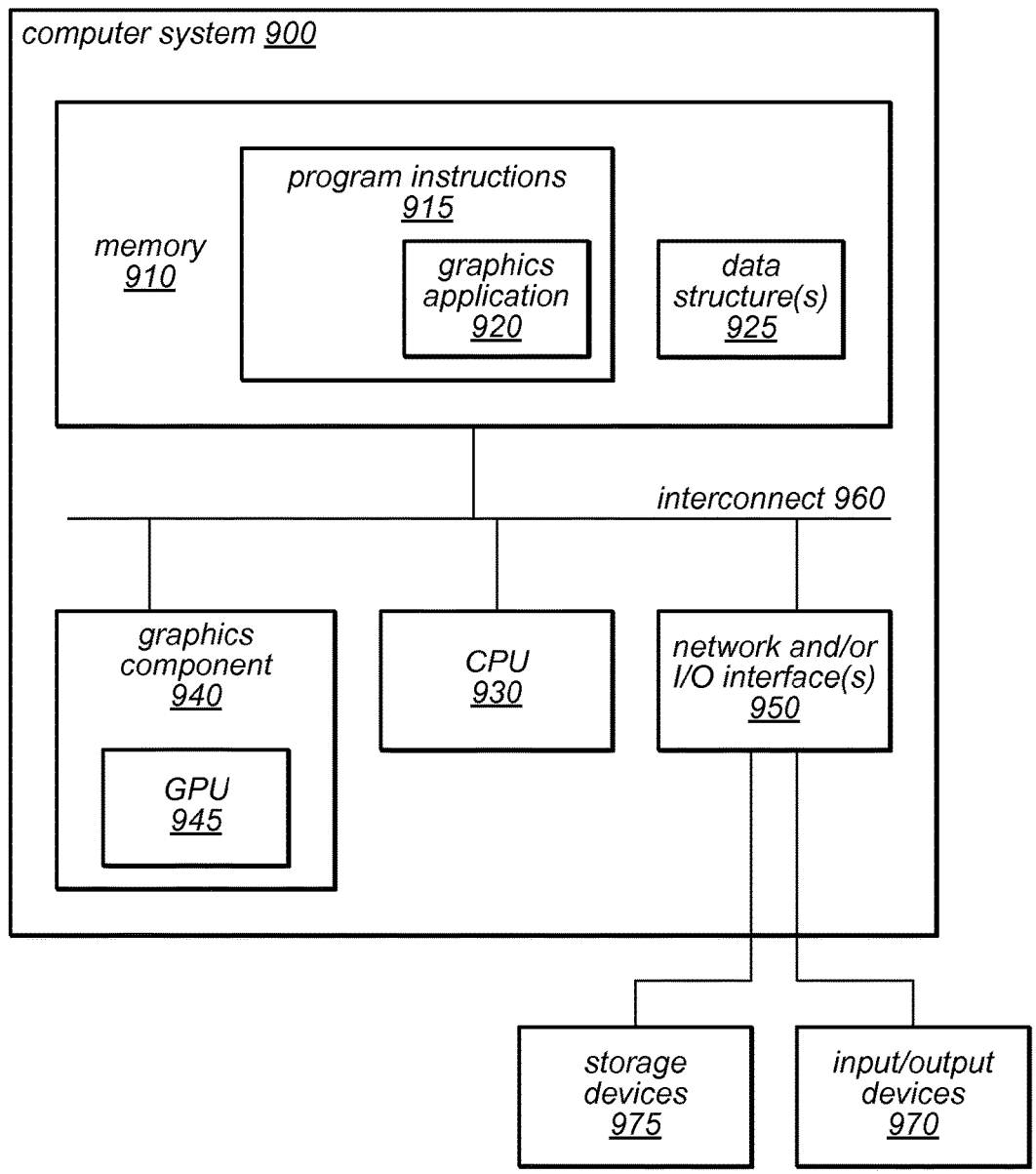
FIG. 9 illustrates a computer system configured to implement a visual rewind operation, according to one embodiment.

The methods described herein for capturing, compressing, and storing image data and interaction logs, and using the stored information in a visual rewind operation may be implemented by a computer system configured to provide the functionality described. FIG. 9 is a block diagram illustrating constituent elements of a computer system 900 that is configured to implement embodiments of the systems and methods described herein, according to one embodiment. Computer system 900 may be one of any of various types of devices, including, but not limited to, a personal computer system, desktop computer, laptop, notebook or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device. As illustrated in FIG. 9, computer system 900 may in various embodiments include memory 910, a graphics component 940, one or more processor units (CPUs) 930, and one or more network and/or input/output interfaces 950. The illustrated components, including processor(s) 930, system memory 910, and others, may be coupled to each other by at least one communications bus, shown as interconnect 960 (e.g., a system bus, LDT, PCI, ISA, or other communication bus type), and/or by interface 950 (e.g., an ATM interface, an Ethernet interface, a Frame Relay interface, or other network interface). The CPU 930, the interface 950, and the memory 910 may be coupled to the interconnect 960. It should also be noted that one or more components of system 900 might be located remotely and accessed via a network, in some embodiments.

Processors 930 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 900, such as various versions of Unix, Linux, Windows® from Microsoft Corporation, MacOS® from Apple Corporation, or any other operating system that enables the operation of software on a hardware platform.

System memory 910 may include one or more of cache, SRAM, DRAM, RDRAM, EDO RAM, DDR RAM, SDRAM, Rambus RAM, EEPROM, or other memory type), or other types of RAM or ROM. Memory 910 may include other types of memory as well, or combinations thereof. One or more of memories 910 may include program instructions 915 executable by one or more of processors 930 to implement aspects of the techniques described herein for capturing, compressing, and storing image data and interaction logs, and for using the stored information in a visual rewind operation and/or other image processing operations. Program instructions 915, which may include program instructions configured to implement graphics application 920, may be partly or fully resident within the memory 910 of computer system 900 at any point in time. Alternatively, program instructions 915 may be provided to CPU 930 and/or GPU 945 for performing capturing, compressing, and storing image data and interaction logs, and using the stored information in a visual rewind operation, and/or executing image processing operations (or portions thereof) on CPU 930 and/or GPU 945 using one or more of the techniques described herein. In some embodiments, the techniques described herein may be implemented by a combination of program instructions 915 executed on one or more processors 930 and one or more GPUs 945, respectively. Program instructions 915 may also be stored on an external storage device 975 accessible by the processor(s) 930 and/or GPU 945, in some embodiments. Any of a variety of such storage devices may be used to store the program instructions 915 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 930 and/or GPU 945 through one or more interfaces including, but not limited to, interconnect 960 or interface 950, as described herein. In some embodiments, the program instructions 915 may be provided to the computer system 900 via any suitable computer-readable storage medium including memory 910 and/or external storage devices 975 described above. Memory 910 may also be configured to implement one or more data structures 925, such as one or more data structures configured to store data representing one or more input images, output images, or intermediate images (e.g., image data captured and/or compressed during image editing operations of the images), one or more interaction logs, and/or one or more stored image editing scripts. Data structures 925 may be accessible by processor(s) 930 and/or GPU 945 when executing graphics application 920 or other program instructions 915.

As described herein, a graphics application such as graphics application 920 may be configured to perform automated capture, compression, and/or storage of image data and interaction logs for use in a visual rewind operation as part of various image processing functions and may render new or reconstructed output images according to the functions performed. In another example, graphics application 920 may perform various transformations and/or inverse transformations of image data to produce compressed and decompressed versions of images, in some embodiments. Graphics application 920 may be configured to render output images and/or image editing animations to a separate window, or directly into the same frame buffer containing the corresponding input images, in different embodiments.

Graphics application 920 may represent various types of graphics applications, such as painting, publishing, photography, games, animation, and other applications. Additionally, graphics application 920 may utilize graphics processor 945 when processing, rendering, or displaying images according to various embodiments.

Graphics application 920 may be provided as a computer program product, or software, that may include a computer-readable storage medium having stored thereon instructions, which may be used to program a computer system (or other electronic devices) to implement capturing, compressing, and storing image data and interaction logs, and using the stored information in a visual rewind operation described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As noted above, in some embodiments, memory 910 may include program instructions 915, comprising program instructions configured to implement graphics application 920, as described herein. Graphics application 920 may be implemented in various embodiments using any desired programming language, scripting language, or combination of programming languages and/or scripting languages, e.g., C, C++, C#, Java™, Perl, etc. For example, in one embodiment, graphics application 920 may be JAVA based, while in another embodiments, it may be implemented using the C or C++ programming languages. In other embodiments, graphics application 920 may be implemented using specific graphic languages specifically for developing programs executed by specialized graphics hardware, such as GPU 945. In addition, graphics application 920 may be embodied on memory specifically allocated for use by graphics processor(s) 945, such as memory on a graphics component 940 including graphics processor(s) 945. Thus, memory 910 may represent dedicated graphics memory as well as general-purpose system RAM, in various embodiments. Other information not described herein may be included in memory 910 and may be used to implement the methods described herein and/or other functionality of computer system 900.

Note that program instructions 915 may be configured to implement various modules described above (e.g., a log generator 720, an image capture module 730, an image data compressor 740, and/or an image de-compressor 750) as stand-alone applications, or as modules of another graphics application or graphics library, in various embodiments. For example, in one embodiment program instructions 915 may be configured to implement graphics applications such as painting, publishing, photography, games, animation, and/or other applications, and may be configured to capture, compress, and store image data and interaction logs, and to use the stored information in a visual rewind operation as part of one or more of these graphics applications. In another embodiment, program instructions 915 may be configured to implement the techniques described herein in one or more functions called by another graphics application executed on GPU 940 and/or processor(s) 930. Program instructions 915 may also be configured to render images and present them on one or more displays as the output of an image processing operation and/or to store image data for processed images in memory 910 and/or an external storage device(s) 975, in various embodiments. For example, a graphics application 920 included in program instructions 915 may utilize GPU 940 when capturing, compressing, and storing image data and interaction logs, when using the stored information in a visual rewind operation, and/or when rendering or displaying images and/or animations, in various embodiments.

As illustrated in FIG. 9, a specialized graphics card or other graphics component 940 may be coupled to the processor(s) 930. The graphics component 940 may include a graphics processing unit (GPU) 945. Additionally, the computer system 900 may include or be coupled to one or more imaging devices, such as input/output devices 970. The one or more imaging devices may include various types of raster-based imaging devices such as monitors and printers. In one embodiment, one or more display devices may be coupled to the graphics component 940 for display of data provided by the graphics component 940 (not shown).

A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 940 may implement a number of graphics primitive operations in a way that makes executing them much faster than drawing directly to the screen with a host central processing unit (CPU), such as CPU 930. In various embodiments, the methods described herein for capturing, compressing, and storing image data and interaction logs, and using the stored information in a visual rewind operation and/or otherwise processing an image may be implemented by program instructions configured for parallel execution on two or more such GPUs. The GPU 945 may implement one or more application programmer interfaces (APIs) that permit programmers to invoke the functionality of the GPU. Suitable GPUs may be commercially available from vendors such as NVIDIA Corporation, ATI Technologies, and others. In some embodiments, graphics component 940 may interface with the motherboard of computer system 900 by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 9, memory 910 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 940 and the rest of the computer system 900 may travel through a graphics card slot or other interface, such as interconnect 960 of FIG. 900.

Interface 950 may be configured to enable computer system 900 to communicate with other computers, systems or machines, such as across a network. A network interface 950 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 900 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 950 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Computer system 900 may also include one or more additional I/O interfaces 950, such as interfaces for one or more input/output devices 970, or such devices may be coupled to computer system 900 via a network interface 950. For example, computer system 900 may include interfaces to a keyboard, a mouse or other cursor control device, a joystick, or other user input devices 970, in various embodiments. Additionally, the computer system 900 may include one or more displays, coupled to processors 930 and/or other components via interconnect 960 or I/O interface 950. Such input/output devices may be configured to allow a user to interact with graphics application 920 to request various image processing operations (including capturing edits, and performing visual rewind operations) and/or to specify various parameters, thresholds, and/or other configurable options available to the user when processing images by executing graphic application 920. It will be apparent to those having ordinary skill in the art that computer system 900 may also include numerous other elements not shown in FIG. 9.

While various image editing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. For example, in various embodiments, the operations shown in FIGS. 1, 2, 3, and 5 may be performed in a different order than the illustrated order. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
    one or more processors; and
    a memory coupled to the one or more processors and storing program instructions executable by the one or more processors to implement operations including:
        causing an image to be displayed via an image editing application;
        ascertaining whether a particular pixel block of the image has been updated in a pre-determined amount of time;
        designating a key frame that represents a current state of the image in response to ascertaining that the pixel block has not been updated in the pre-determined amount of time;
        determining whether there are differences due to one or more image editing operations between adjacent frames of a sequence of frames captured subsequent to the key frame, the sequence of frames having been displayed by the image editing application during performance of the one or more image editing operations, wherein each frame is associated with an identifier of the frame and at least some of the frames represent sub-operations of a single image editing operation defined by a single interaction with the image editing application;
        recording image data of the image representing only frames having differences with an adjacent frame in the sequence of frames;

recording data representing a log of interactions and corresponding changes in application state for the image editing application during the performance of the one or more image editing operations;

determining a correlation between each of a plurality of entries in the log and a respective frame identifier, wherein the respective frame identifier corresponds to a frame of the sequence of frames having a difference with an adjacent frame due to the interaction and corresponding changes in application state represented by the entry;

storing the recorded image data, the log data, and data representing the correlation between each of the plurality of entries and the respective frame identifier; and displaying at least a portion of the sequence of frames based on the stored data such that the at least some frames are individually displayable to display the single image editing operation as a sequence of the sub-operations of the single image editing operation.

2. The system of claim 1, wherein each frame identifier comprises a timestamp, wherein each entry of the log comprises a timestamp, and wherein said determining a correlation comprises identifying a log entry and a frame identifier comprising matching timestamps.

3. The system of claim 1, wherein said recording image data comprises
capturing data reflecting determined differences between the adjacent frames.

4. The system of claim 1, wherein the operations further comprise capturing image data representing a complete frame for frames identified as further key frames that occur subsequent to the key frame.

5. The system of claim 1, wherein the one or more image editing operations comprises at least a subset of an atomic collection of image editing operations.

6. The system of claim 1, wherein the operations further comprise, in response to receiving input indicating invocation of a visual rewind operation in the image editing application, initiating display of the sequence of frames in reverse order.

7. The system of claim 6, wherein the operations further comprise, in response to receiving input indicating a suspension of the visual rewind operation:
generating image data representing an image state at a point during the performance of the one or more image editing operations corresponding to a frame of the sequence of frames currently being displayed, wherein said generating is based on the identifier of the frame and the stored data representing the correlation between the identifier of the frame and the respective log entry; and
storing the image data representing the image state at a point during the performance of the one or more image editing operations corresponding to the frame of the sequence of frames currently being displayed as data representing a modified image.

8. The system of claim 7, wherein said generating comprises:
determining the key frame preceding the frame in the sequence of frames;
identifying one or more log entries representing interactions and corresponding application state changes logged between the log entry for the key frame and the log entry for the frame; and applying the interactions represented by the identified log entries to image data representing the key frame to reconstruct the image state depicted in the frame.

9. The system of claim 1, wherein the operations further comprise compressing the recorded image data.

10. The system of claim 1,
wherein the one or more processors comprise at least one of: a general-purpose central processing unit (CPU) and a graphics processing unit (GPU); and
wherein said recording image data is implemented by program instructions executed by the GPU.

11. A non-transitory computer-readable storage medium, storing program instructions that are computer-executable to implement operations comprising:
causing an image including a sequence of frames to be displayed via an image editing application;
ascertaining whether a particular pixel block of the image has been updated in a pre-determined number of sequential frames;
designating a key frame that represents a current state of the image in response to ascertaining that the pixel block has not been updated in the pre-determined number of sequential frames;
determining whether there are differences due to one or more image editing operations between adjacent frames of a sequence of frames that occur subsequent to the key frame, the sequence of frames displayed by the image editing application during performance of the one or more image editing operations, wherein each frame is associated with an identifier of the frame;
capturing image data of the image representing only frames having differences with an adjacent frame in the sequence of frames;
capturing data representing a log of interactions and corresponding changes in application state for the image editing application during the performance of the one or more image editing operations;
determining a correlation between each of a plurality of entries in the log and a respective frame identifier, wherein the respective frame identifier corresponds to a frame of the sequence of frames having a difference with an adjacent frame due to corresponding changes in application state represented by the entry;
storing the captured image data, the log data, and data representing the correlation between each of the plurality of entries and the respective frame identifier; and
displaying at least a portion of the sequence of frames based on the stored data and as part of a visual rewind of the one or more image editing operations displayed in reverse order as a series of sub-operations.

12. The non-transitory computer-readable storage medium of claim 11, wherein each frame identifier comprises a timestamp, wherein each entry of the log comprises a timestamp, and wherein said determining a correlation comprises identifying a log entry and a frame identifier comprising matching timestamps.

13. The non-transitory computer-readable storage medium of claim 11, wherein the operations further comprise, in response to receiving input indicating a suspension of the visual rewind operation:
generating image data representing the image state at a point during the performance of the one or more image editing operations corresponding to the frame of the sequence of frames currently being displayed, wherein said generating is based on the identifier of the frame and the stored data representing the correlation between the identifier of the frame and the respective log entry; and storing the image data representing the image state at a point during the performance of the one or more image editing operations corresponding to the frame of the sequence of frames currently being displayed as data representing a modified image.

14. A method, comprising:
using at least one computer to perform:
    designating a key frame that represents an atomic collection of multiple image editing operations applied to an image via an image editing application;
    capturing image data representing a sequence of frames that occur subsequent to the key frame, the sequence of frames displayed by the image editing application during performance of one or more further image editing operations that occur subsequent to the collection of image editing operations, wherein each frame is associated with an identifier of the frame and at least some of the frames represent sub-operations of a single image editing operation defined by a single interaction with the image editing application;
    compressing the image data for storage by determining whether there are differences due to the one or more further image editing operations between adjacent frames of the sequence of frames and storing image data representing only frames having differences with an adjacent frame in the sequence of frames; and
    displaying at least a portion of the sequence of frames from the compressed image data, the portion of the sequence of frames displayed such that the at least some frames are individually displayed as at least part of a sequence of the sub-operations of the single image editing operation.

15. The method of claim 14, wherein said displaying occurs responsive to an invocation of a visual rewind operation in the image editing application, and further includes initiating display of the sequence of frames from the compressed image data in reverse order.

16. The method of claim 15, wherein the visual rewind operation causes a partial undo operation of the single interaction with the image editing application.

17. The method of claim 14, further comprising logging the single interaction with the image editing application, and causing the logged single interaction to be applied to a different portion of an image than a portion of the image to which the single interaction was originally applied.

18. The method of claim 14, further comprising cutting the single interaction with the image editing application, and causing the single interaction to be applied to a different image than an image to which the single interaction was originally applied.

19. The method of claim 14, wherein the single interaction comprises a brushstroke added to an image, and the at least some frames each comprise different respective portions of the brushstroke.

20. The method of claim 14, wherein the single interaction comprises a movement of a stylus to edit at least a portion of an image, and the at least some frames each correspond to different sub-portions of the movement of the stylus.

* * * * *